(12) United States Patent
Ito

(10) Patent No.: US 10,113,779 B2
(45) Date of Patent: Oct. 30, 2018

(54) EXPANSION VALVE

(71) Applicant: DENSO CORPORATION, Kariya, Aichi-pref. (JP)

(72) Inventor: Shigeki Ito, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 209 days.

(21) Appl. No.: 14/917,416

(22) PCT Filed: Sep. 2, 2014

(86) PCT No.: PCT/JP2014/004489
§ 371 (c)(1),
(2) Date: Mar. 8, 2016

(87) PCT Pub. No.: WO2015/037207
PCT Pub. Date: Mar. 19, 2015

(65) Prior Publication Data
US 2016/0223233 A1  Aug. 4, 2016

(30) Foreign Application Priority Data

Sep. 11, 2013  (JP) .................................. 2013-188185

(51) Int. Cl.
*G05D 23/02* (2006.01)
*G05D 23/12* (2006.01)
(Continued)

(52) U.S. Cl.
CPC .......... *F25B 41/062* (2013.01); *F16K 31/002* (2013.01); *F25B 2341/0683* (2013.01); *F25B 2500/01* (2013.01)

(58) Field of Classification Search
CPC ............ F25B 41/062; F25B 2341/0683; F25B 2500/01; F16K 31/002
See application file for complete search history.

(56) References Cited

U.S. PATENT DOCUMENTS

| | | | | |
|---|---|---|---|---|
| 2,978,879 | A | * | 4/1961 | Heidorn ................ F25B 49/005 200/81.5 |
| 2006/0198740 | A1 | | 9/2006 | Yamamoto et al. |
| 2010/0163637 | A1 | * | 7/2010 | Ikegami ................ F25B 41/062 236/92 B |

FOREIGN PATENT DOCUMENTS

| | | |
|---|---|---|
| JP | S57208375 A | 12/1982 |
| JP | S62019575 U | 2/1987 |

(Continued)

OTHER PUBLICATIONS

Tomatsu et al., Pressure Control Valve, Jul. 14, 2000, JP2000193347A, Whole Document.*

(Continued)

*Primary Examiner* — Larry Furdge
(74) *Attorney, Agent, or Firm* — Harness, Dickey & Pierce, P.L.C.

(57) ABSTRACT

When a power element expands in a direction of a uniaxial center, a diaphragm is pressed, in the direction of the uniaxial center, against a pressing portion of a lid member fixed to a body unit. A holder member of the power element is displaced away from the pressing portion as the diaphragm further expands outward in the direction of the uniaxial center. Displacement of the holder member in the direction of the uniaxial center is transmitted to a spherical valve, thereby increasing or decreasing an opening degree of the spherical valve. Accordingly, it is not necessary to dispose a member which may cause complicated processing work for an expansion valve between the holder member and the spherical valve, e.g., a member which needs complicated welding processing work.

20 Claims, 19 Drawing Sheets

(51) Int. Cl.
*G05D 23/13* (2006.01)
*F25B 41/06* (2006.01)
*F16K 31/00* (2006.01)

(56) References Cited

FOREIGN PATENT DOCUMENTS

| | | |
|---|---|---|
| JP | H03038600 Y2 | 8/1991 |
| JP | H04070968 U | 6/1992 |
| JP | H08004992 A | 1/1996 |
| JP | H08028785 A | 2/1996 |
| JP | 2000193347 A * | 7/2000 |
| JP | 2002310539 A | 10/2002 |
| JP | 2004028491 A | 1/2004 |
| JP | 2006242007 A | 9/2006 |
| JP | 2009097808 A | 5/2009 |
| JP | 2010230249 A | 10/2010 |
| JP | 2012107641 A | 6/2012 |
| JP | 2012174256 A | 9/2012 |
| JP | 2013029241 A | 2/2013 |
| WO | WO-2011122435 A1 | 10/2011 |
| WO | WO-2015037208 A1 | 3/2015 |

OTHER PUBLICATIONS

Yoon, Expansion Valve . . . , May 24, 2005, KR20050048070A, Whole Document.*
International Search Report and Written Opinion (in Japanese with English Translation) for PCT/JP2014/004489, dated Nov. 25, 2014; ISA/JP.

* cited by examiner

EXPANSION VALVE

CROSS-REFERENCE TO RELATED APPLICATIONS

This application is a U.S. National Phase Application under 35 U.S.C. 371 of International Application No. PCT/JP2014/004489 filed on Sep. 2, 2014 and published in Japanese as WO 2015/037207 A1 on Mar. 19, 2015. This application is based on and claims the benefit of priority from Japanese patent application No. 2013-188185 filed on Sep. 11, 2013. The entire disclosures of all of the above applications are incorporated herein by reference.

TECHNICAL FIELD

This disclosure relates to an expansion valve which decompresses a fluid.

BACKGROUND ART

PTL 1 discloses an expansion valve that includes an expansion unit configured to have a valve body which has a decompressing flow channel provided for decompressing a flowing fluid and which opens or closes the decompressing flow channel, and a diaphragm. The expansion valve disclosed in PTL 1 includes a temperature-sensing reactive member and an actuating bar, in addition to a power element serving as the expansion unit and the valve body. The temperature-sensing reactive member has a support portion which is in contact with the diaphragm and a temperature-sensing portion which axially extends from the support portion. An internal space which extends to the temperature-sensing portion is provided in the temperature-sensing reactive member. The support portion has a flange shape so as not to locally press the diaphragm. A communication hole is disposed in the diaphragm by causing a space inside the expansion unit and the internal space of the temperature-sensing reactive member to communicate with each other in order to enclose a refrigerant therein. The diaphragm and the temperature-sensing reactive member are hermetically joined to each other by means of welding.

The actuating bar is interposed between the temperature-sensing portion of the temperature-sensing reactive member and the valve body. The diaphragm expands, thereby transmitting displacement in the axial direction of the temperature-sensing reactive member to the valve body. That is, in the expansion valve disclosed in PTL 1, expansion of the expansion unit is transmitted from the diaphragm to the temperature-sensing reactive member, the actuating bar, and the valve body in this order.

PRIOR ART LITERATURE

Patent Literature

PTL 1: JP 2013-29241 A

SUMMARY OF THE INVENTION

According to the expansion valve disclosed in PTL 1, as described above, the temperature-sensing reactive member is joined to the diaphragm so that the space inside the expansion unit and the internal space of the temperature-sensing reactive member hermetically communicate with each other. Consequently, there is a possibility that processing work for the expansion valve may become complicated.

In the expansion valve disclosed in PTL 1, if the temperature-sensing reactive member is merely no longer in use, the actuating bar locally presses the diaphragm, thereby causing a possibility of stress concentration on the diaphragm.

This disclosure is made in view of the above-described points, and an object thereof is to provide an expansion valve which can avoid complicated processing work which is caused by providing a member corresponding to a temperature-sensing reactive member disclosed in PTL 1.

In a first aspect of the present disclosure, an expansion valve including:

an expansion unit that has a diaphragm expanding in an axial direction of a uniaxial center, and an enclosing space forming member stacked with the diaphragm in the axial direction, the enclosing space forming member defining a fluid enclosing space, in which an enclosed fluid is sealed, between the diaphragm and the enclosing space forming member in the axial direction;

a flow channel forming portion that defines a first flow channel through which a flowing fluid flows, the first flow channel having a decompressing flow channel to decompress the flowing fluid;

a valve body that selectively opens and closes the decompressing flow channel;

a pressing portion that is fixed to the flow channel forming portion, the diaphragm being pressed against the pressing portion in the axial direction when the diaphragm expands in the axial direction; and a displacement transmitting portion that transmits displacement of the enclosing space forming member along the axial direction to the valve body, the displacement transmitting portion selectively increasing and decreasing an opening degree of the valve body, wherein the enclosing space forming member is displaced away from the pressing portion as the diaphragm outwardly expands in the axial direction.

According to the above-described disclosure, when the diaphragm of the expansion unit expands in the axial direction of the uniaxial center, the diaphragm is pressed, in the axial direction, against the pressing portion fixed to the flow channel forming portion. The enclosing space forming member of the expansion unit is displaced away from the pressing portion as the diaphragm further expands outward in the axial direction. Displacement in the axial direction of the enclosing space forming member is transmitted to the valve body, thereby increasing or decreasing an opening degree of the valve body. As a result, it is not necessary to dispose a member corresponding to the temperature-sensing reactive member disclosed in PTL 1, between the enclosing space forming member and the valve body. Therefore, complicated processing work for the expansion valve which is caused by providing the member corresponding to the temperature-sensing reactive member can be avoided.

EMBODIMENTS FOR CARRYING OUT INVENTION

Figure 1:
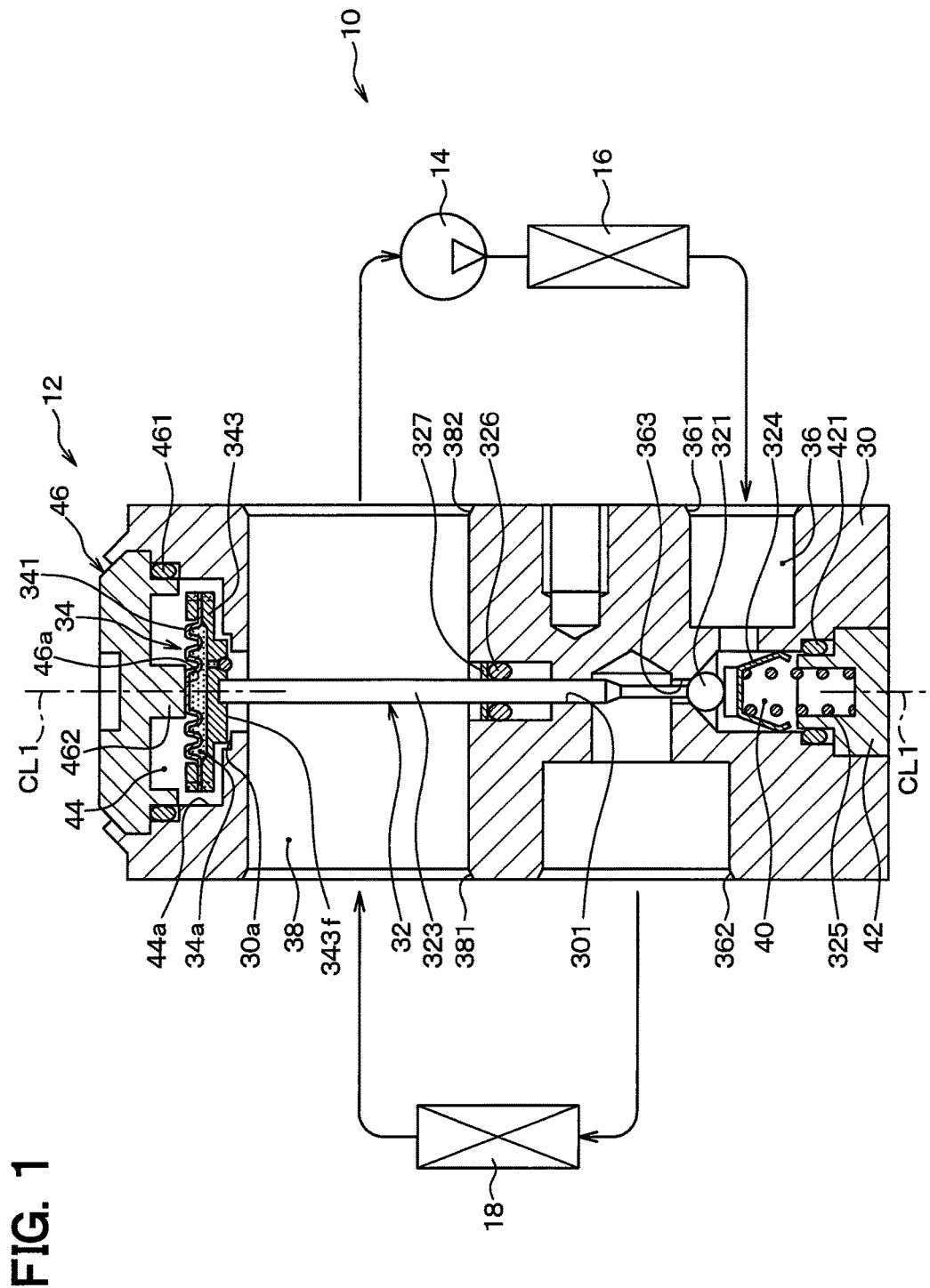
FIG. 1 is a cross-sectional view of a temperature type expansion valve 12 according to a first embodiment.

Hereinafter, embodiments according to this disclosure will be described with reference to the drawings. In the following respective embodiments, the same reference numerals are given to elements which are the same as or equivalent to each other in the drawings.

First Embodiment

FIG. 1 is a cross-sectional view of a temperature type expansion valve 12 to which this disclosure is applied. The temperature type expansion valve 12 (hereinafter, simply referred to as an expansion valve 12) configures a part of a vehicle vapor compression type refrigeration cycle 10. FIG. 1 also schematically illustrates a connection relationship between the expansion valve 12 and each configuration device of the vapor compression type refrigeration cycle 10.

The vapor compression type refrigeration cycle 10 employs a fluorocarbon refrigerant (for example, R134a) as a refrigerant. The vapor compression type refrigeration cycle 10 configures a subcritical cycle in which a high pressure-side refrigerant pressure does not exceed a critical pressure of the refrigerant. First, in the vapor compression type refrigeration cycle 10 illustrated in FIG. 1, a compressor 14 sucks and compresses the refrigerant by obtaining a driving force from a vehicle engine (not illustrated) via an electromagnetic clutch.

A condenser 16 is a heat radiation heat exchanger in which a high-pressure refrigerant is subjected to heat radiation and condensed by performing heat exchange between the high-pressure refrigerant discharged from the compressor 14 and air outside a vehicle compartment which is fresh air blown by a cooling fan (not illustrated). For example, an outlet side of the condenser 16 is connected to the expansion valve 12 via a receiver (not illustrated) which separates gas and liquid.

The expansion valve 12 is a decompressing device which causes the high-pressure refrigerant to flow to an inlet side of an evaporator 18 while decompressing and expanding the high-pressure refrigerant which has flowed out from the condenser 16. The expansion valve 12 decompresses and expands the high-pressure refrigerant which has flowed out from the condenser 16. Based on a temperature and a pressure of an evaporator outflow refrigerant which has flowed out from the evaporator 18, the expansion valve 12 changes a throttle passage area so that a degree of superheat of the evaporator outflow refrigerant is close to a predetermined value, and controls a refrigerant flow rate which is caused to flow to the inlet side of the evaporator 18. A detailed configuration of the expansion valve 12 will be described later.

The evaporator 18 is a heat-absorbing heat exchanger in which a heat absorbing effect is achieved by evaporating a low-pressure refrigerant through heat exchange between the low-pressure refrigerant decompressed and expanded in the expansion valve 12 and air blown by a blower fan (not illustrated). Furthermore, an outlet side of the evaporator 18 is connected to an intake side of the compressor 14 via a second refrigerant passage 38 provided inside the expansion valve 12.

Next, a detailed configuration of the expansion valve 12 will be described. As illustrated in FIG. 1, the expansion valve 12 is configured to have a body unit 30, a valve mechanism 32, and a power element 34.

The body unit 30 configures an outer shell of the expansion valve 12 and a refrigerant passage inside the expansion valve 12. For example, the body unit 30 is provided by performing drilling work on a cylindrical or prismatic metal block made of an aluminum alloy. The body unit 30 is a housing which forms an outer shape of the expansion valve 12. A first refrigerant passage 36, the second refrigerant passage 38, and a valve chamber 40 are provided in the body unit 30. In other words, the body unit 30 is a flow channel forming portion which provides the first refrigerant passage 36 and the second refrigerant passage 38.

The first refrigerant passage 36 is a first flow channel through which a refrigerant serving as a flowing fluid flows, and is a channel disposed in order to decompress the refrigerant. The first refrigerant passage 36 has a first inlet port 361 in one end thereof, and has a first outlet port 362 in the other end. The first inlet port 361 is connected to the outlet side of the condenser 16, and the first outlet port 362 is connected to the inlet side of the evaporator 18.

The second refrigerant passage 38 is a channel through which the refrigerant flows, and is a second flow channel which is separate from the first refrigerant passage 36. The second refrigerant passage 38 has a second outlet port 382 in one end thereof, and has a second inlet port 381 in the other end. The second inlet port 381 is connected to the outlet side of the evaporator 18, and the second outlet port 382 is connected to the intake side of the compressor 14.

The valve chamber 40 is a space which is disposed in an intermediate portion of the first refrigerant passage 36 and internally accommodates a spherical valve 321 of the valve mechanism 32 (to be described later). Specifically, the valve chamber 40 directly communicates with the first inlet port 361, and communicates with the first outlet port 362 via a throttle passage 363. The throttle passage 363 configures a portion of the first refrigerant passage 36, and is a decompressing flow channel which decompresses the refrigerant flow by throttling a flow of the refrigerant. That is, the throttle passage 363 is a passage in which the refrigerant flowing from the first inlet port 361 to the valve chamber 40 is guided from the valve chamber 40 side to the first outlet port 362 side while the refrigerant is decompressed and expanded.

The valve mechanism 32 includes the spherical valve 321, an actuating bar 323, a vibration-isolating spring 324, and a coil spring 325, and is accommodated inside the body unit 30. The spherical valve 321, the actuating bar 323, the vibration-isolating spring 324, and the coil spring 325 are arranged on a uniaxial center CL1, and the spherical valve 321 is operated in a direction of the uniaxial center CL1.

The spherical valve 321 is a valve body which opens or closes the first refrigerant passage 36 by being displaced in the direction of the uniaxial center CL1. In detail, the spherical valve 321 opens or closes the throttle passage 363, and controls a refrigerant passage area of the throttle passage 363 by being displaced in the direction of the uniaxial center CL1. That is, the spherical valve 321 increases or decreases a refrigerant flow rate in the first refrigerant passage 36 by being displaced in the direction of the uniaxial center CL1.

The valve chamber 40 accommodates the vibration-isolating spring 324 and the coil spring 325 together with the spherical valve 321. The vibration-isolating spring 324 restricts unnecessary vibrations of the spherical valve 321 by sliding on the valve chamber 40. The coil spring 325 applies a load for actuating the throttle passage 363 to be closed, to the spherical valve 321 via the vibration-isolating spring 324. FIG. 1 illustrates a state where the valve mechanism 32 completely closes the throttle passage 363, that is, a fully closed state of the first refrigerant passage 36.

The expansion valve 12 includes an adjusting screw 42 which is screwed into the body unit 30 so as to press the spherical valve 321 against an end portion of the throttle passage 363 via the coil spring 325. A load of the coil spring 325 for actuating the spherical valve 321 can be adjusted by rotating the adjusting screw 42. An O-ring 421 is disposed between the adjusting screw 42 and the body unit 30. The O-ring 421 prevents the refrigerant from leaking out from the valve chamber 40 to the outside of the expansion valve 12.

The actuating bar 323 has a cylindrical shape extending in the direction of the uniaxial center CL1, and is interposed between the power element 34 and the spherical valve 321. The actuating bar 323 functions as a displacement transmission unit which transmits displacement in the direction of the uniaxial center CL1 of a holder member 343 of the power element 34 to the spherical valve 321. The actuating bar 323 transmits the displacement in the direction of the uniaxial center CL1 of the holder member 343 to the spherical valve 321, thereby increasing or decreasing a opening degree of the spherical valve 321.

The actuating bar 323 is fitted to a fitting hole 301 provided in the body unit 30. In this manner, the actuating bar 323 is restrained in the radial direction of the uniaxial center CL1 with respect to the body unit 30. That is, the actuating bar 323 is movable only in the direction of the uniaxial center CL1 with respect to the body unit 30.

One end of the actuating bar 323 abuts against the holder member 343 of the power element 34 in the direction of the uniaxial center CL1, and the other end of the actuating bar 323 abuts against the spherical valve 321 after being inserted into the throttle passage 363.

An O-ring 326 into which the actuating bar 323 is inserted is held in the body unit 30 by a retaining ring 327. The O-ring 326 prevents the refrigerant from flowing between the first refrigerant passage 36 and the second refrigerant passage 38 by passing through a gap between the actuating bar 323 and the body unit 30.

The power element 34 is accommodated inside an accommodating space 44 provided in the body unit 30. In detail, the accommodating space 44 is provided by the body unit 30 and a lid member 46 which is fitted and joined to the body unit 30 by means of caulking. A radial clearance large enough to allow an arrangement of the power element 34 to vary in the radial direction of the uniaxial center CL1 is provided between the power element 34 and a side wall surface 44a of the accommodating space 44. An O-ring 461 is disposed between the lid member 46 and the body unit 30. The O-ring 461 prevents the refrigerant from flowing from the accommodating space 44 to the outside of the expansion valve 12. The power element 34 corresponds to an expansion unit according to this disclosure.

The lid member 46 configures a part of the accommodating space 44, and isolates the power element 34 from an outer space of the expansion valve 12. The lid member 46 includes a pressing portion 462 against which a diaphragm 341 is pressed in the direction of the uniaxial center CL1 when the diaphragm 341 of the power element 34 expands in the direction of the uniaxial center CL1. A contact surface 46a which is in contact with the diaphragm 341 of the power element 34 in the direction of the uniaxial center CL1 is provided in the pressing portion 462. The contact surface 46a is a fixed surface which is fixed to the body unit 30. The diaphragm 341 expands in the direction of the uniaxial center CL1, and thus is pressed against the contact surface 46a. Accordingly, the holder member 343 is displaced to a side separated from the pressing portion 462 as the diaphragm 341 further expands outward in the direction of the uniaxial center CL1.

Preferably, the lid member 46 is configured to have a material excellent in heat insulating performance, for example, a resin. The pressing portion 462 of the lid member 46 is a portion fixed to the body unit 30, since the lid member 46 is joined to the body unit 30 by means of caulking.

The power element 34 is arranged so as to be interposed between the pressing portion 462 of the lid member 46 and the actuating bar 323 in the direction of the uniaxial center CL1.

Figure 2:
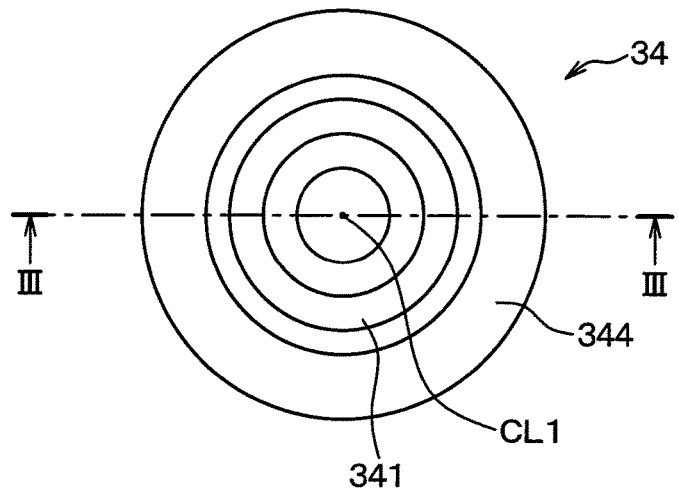
FIG. 2 is a top view of a power element 34 when viewed in a direction of a uniaxial center CL1 in FIG. 1.
Figure 3:
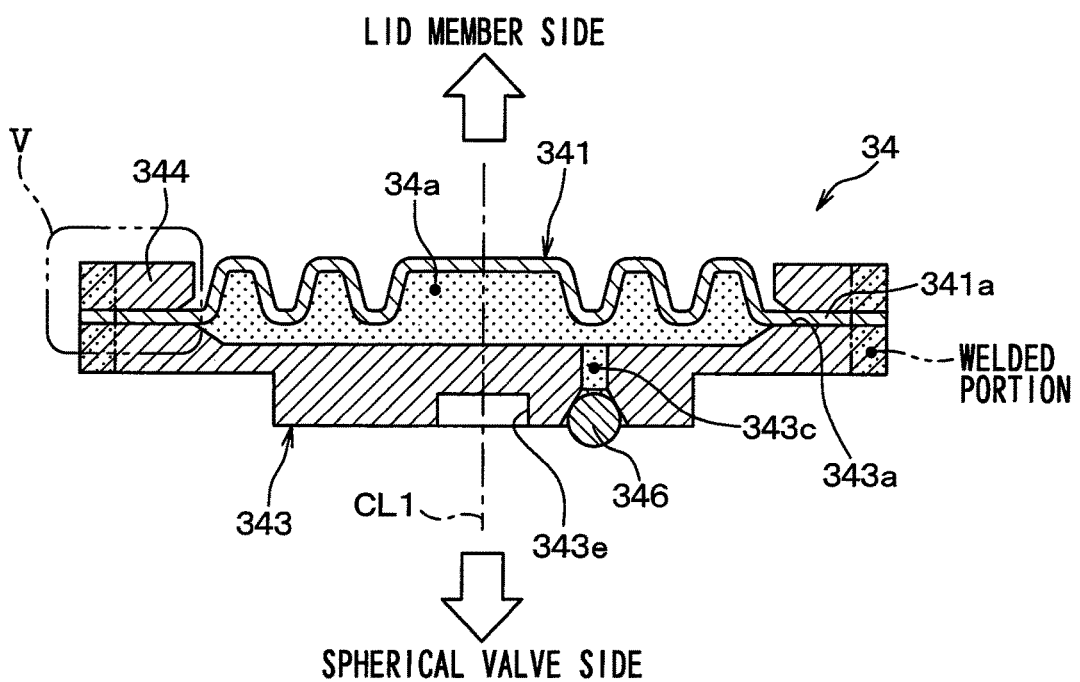
FIG. 3 is a cross-sectional view taken along line III-III in FIG. 2.

As illustrated in FIGS. 2 and 3, the power element 34 includes the diaphragm 341 which has a disc shape, the holder member 343 which has approximately the same diameter as the diaphragm 341, and a collar 344 which has a flat and annular shape. FIG. 2 is a top view of the power element 34 when viewed in the direction of the uniaxial center CL1. FIG. 3 is a cross-sectional view taken along line III-III in FIG. 2.

The diaphragm 341 is configured to include a thin spring member, and is arranged so that the uniaxial center CL1 passes through the center of the diaphragm 341. The holder member 343 is a thick metal component, and is stacked on the diaphragm 341 in the direction of the uniaxial center CL1. The diaphragm 341 expands outward in the direction of the uniaxial center CL1, in accordance with a pressure difference between an internal pressure of the power element 34 and a pressure inside the accommodating space 44 (refer to FIG. 1). The power element 34 withstands a pressing force applied from the coil spring 325 (refer to FIG. 1). In short, a central portion of the diaphragm 341 is displaced in the direction of the uniaxial center CL1, in accordance with a pressure difference therebetween. The accommodating space 44 illustrated in FIG. 1 communicates with the second refrigerant passage 38 so that the temperature and the pressure inside the accommodating space 44 are equal to those inside the second refrigerant passage 38 even if the valve mechanism 32 is located at any stroke position.

As illustrated in FIG. 3, the holder member 343 is stacked on the diaphragm 341 in the direction of the uniaxial center CL1. Therefore, a closed space 34a is provided between the holder member 343 and the diaphragm 341. The closed space 34a is a temperature-sensing chamber for sensing a refrigerant temperature in the second refrigerant passage 38. As the pressure inside the closed space 34a further increases, the diaphragm 341 expands outward in the direction of the uniaxial center CL1. The closed space 34a corresponds to a fluid enclosing space according to this disclosure, and the holder member 343 corresponds to an enclosing space forming member according to this disclosure.

The holder member 343 has a contact surface 343a having an annular shape, and is in contact with a peripheral edge portion 341a belonging to the diaphragm 341, on the contact surface 343a.

A fitting hole 343e configured to include a blind hole serving as a fitting hole is provided on a side opposite to the diaphragm 341 side in the holder member 343. One end of the actuating bar 323 (refer to FIG. 1) is fitted to the fitting hole 343e by means of clearance fitting, for example. In this manner, without being fixed to the actuating bar 323, the power element 34 is held with respect to the actuating bar 323 so that the axis of the power element 34 coincides with the axis of the actuating bar 323. One end of the actuating bar 323 abuts against a bottom surface of the fitting hole 343e.

The holder member 343 has a fluid introduction path 343c which is a thin through-hole and is provided for introducing a fluid mixture of a refrigerant and inert gas into the closed space 34a. The fluid introduction path 343c is closed by a plug 346 after the above-described fluid mixture is introduced into the closed space 34a. That is, the fluid mixture is an enclosed fluid which is enclosed inside the closed space 34a. The temperature inside the accommodating space 44 (refer to FIG. 1) is transferred to the fluid mixture inside the closed space 34a, and the temperature of the fluid mixture becomes coincident with the temperature inside the accommodating space 44. The pressure inside the accommodating space 44 becomes a reaction force acting against the pressure of the fluid mixture, that is, a reaction force acting against an internal pressure of the power element 34.

The collar 344 is arranged on a side opposite to the holder member 343 side in the direction of the uniaxial center CL1 with respect to the diaphragm 341. The collar 344 has a collar contact surface 344a (refer to FIG. 5), and is in contact with the peripheral edge portion 341a of the diaphragm 341, on the collar contact surface 344a. That is, the peripheral edge portion 341a of the diaphragm 341 is pinched by the collar contact surface 344a and the contact surface 343a of the holder member 343.

Next, a manufacturing process of the power element 34 will be described.

First, the collar 344, the diaphragm 341, and the holder member 343 (refer to FIG. 3) are prepared. The collar 344, the diaphragm 341, and the holder member 343 are stacked in this order in the direction of the uniaxial center CL1.

Next, the collar 344 and the holder member 343 which pinch the diaphragm 341 are welded using a laser, for example, over the entire circumference in the circumferential direction of the uniaxial center CL1. The welded portion is illustrated by point hatching in FIG. 3. The laser welding is performed so as to ensure air-tightness in the closed space 34a.

As is understood from FIG. 3, the holder member 343 is joined to an outer side of the diaphragm 341 by means of laser welding, and the outer side of the diaphragm 341 is outward of an inner peripheral end 343d (refer to FIG. 5) of the contact surface 343a in the radial direction of the uniaxial center CL1. The collar 344 is joined to an outer side of the diaphragm 341 by means of laser welding, and the outer side of the diaphragm 341 is outward of an inner peripheral end 344b (refer to FIG. 5) of the collar contact surface 344a in the radial direction of the uniaxial center CL1.

Next, the fluid mixture of the refrigerant and the inert gas is introduced into the closed space 34a from the fluid introduction path 343c. The refrigerant included in the fluid mixture is a gas-liquid two-phase refrigerant, for example. The refrigerant may be different from or may be the same as the refrigerant flowing in the second refrigerant passage 38.

Next, after the above-described fluid mixture is introduced into the closed space 34a, the fluid introduction path 343c is closed by the plug 346. In a state where the fluid introduction path 343c is closed, the plug 346 is joined to an opening portion of the fluid introduction path 343c by means of projection welding, for example. The fluid introduction path 343c is closed in this way, thereby causing the closed space 34a to serve as a fluid enclosing space having the above-described fluid mixture enclosed therein.

Figure 4:
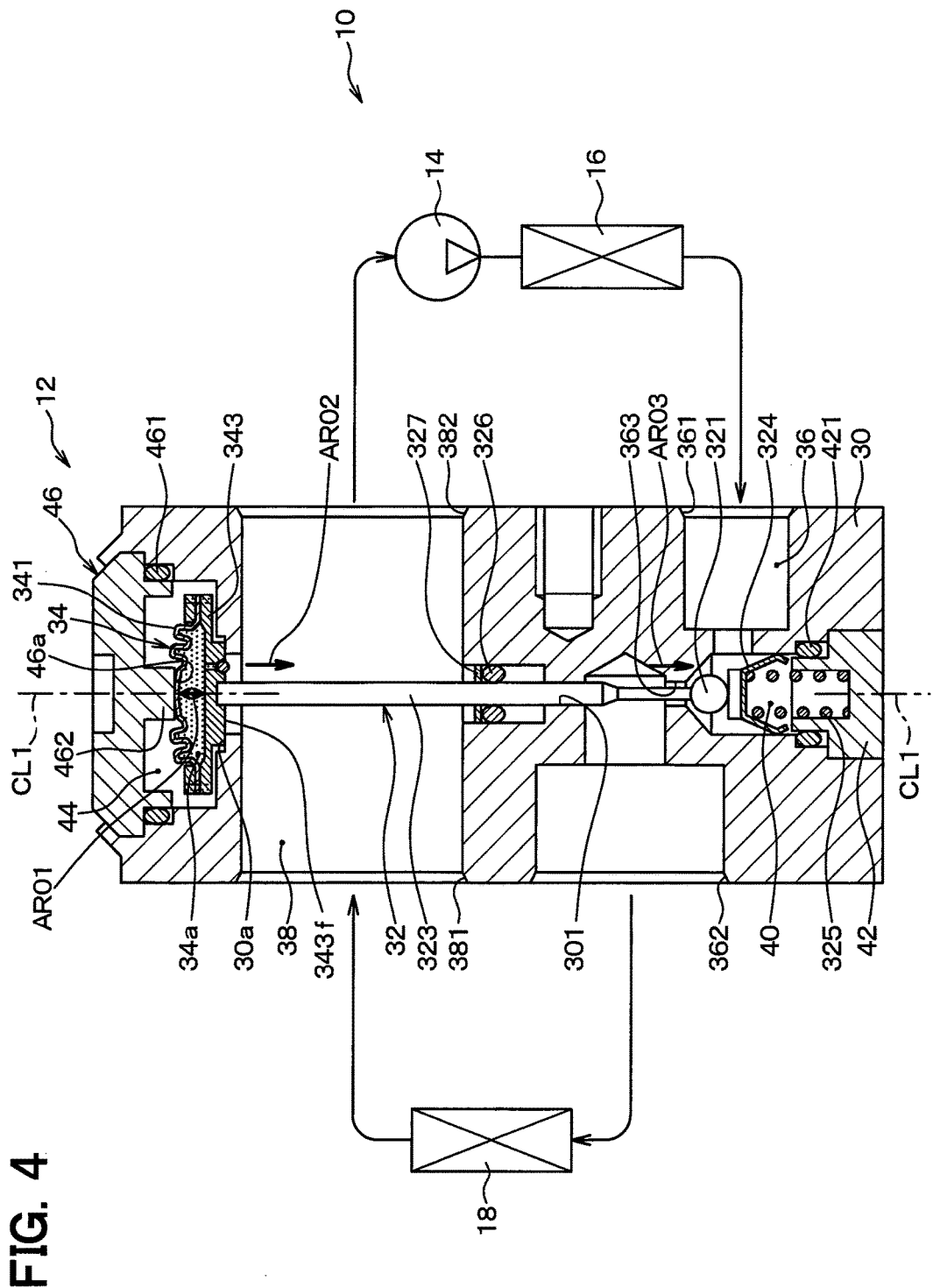
FIG. 4 is a cross-sectional view of the temperature type expansion valve 12 in FIG. 1, and is a view illustrating a state where a valve mechanism 32 maximizes a refrigerant passage area of a throttle passage 363, that is, a state where an opening degree of a spherical valve 321 is maximized.

Next, an operation of the valve mechanism 32 and the power element 34 will be described with reference to FIG. 4. FIG. 4 illustrates a state where the valve mechanism 32 maximizes a refrigerant passage area of the throttle passage 363, that is, a state where a opening degree of the spherical valve 321 is maximized.

In the expansion valve 12, if the temperature of the refrigerant flowing in the second refrigerant passage 38 rises, the temperature inside the accommodating space 44 and the temperature of the fluid mixture enclosed inside the closed space 34a of the power element 34 also accordingly rise, thereby increasing the internal pressure of the closed space 34a. If an expansion force of the power element 34 which is generated due to the internal pressure prevails against a reaction force generated by the coil spring 325, the power element 34 expands in the direction of the uniaxial center CL1 as illustrated by an arrow AR01 in FIG. 4. In detail, the diaphragm 341 expands outward in the direction of the uniaxial center CL1.

If the power element 34 expands as illustrated by the arrow AR01, the diaphragm 341 is pressed against the contact surface 46a of the lid member 46. Since the lid member 46 is fixed to the body unit 30, the holder member 343 of the power element 34 and the actuating bar 323 pressed by the holder member 343 are moved to a side separated from the contact surface 46a as illustrated by an arrow AR02. At the same time, the spherical valve 321 is pressed by the actuating bar 323, and is moved as illustrated by an arrow AR03. That is, the spherical valve 321 opens the throttle passage 363. A opening degree of the spherical valve 321, that is, a opening degree of the expansion valve 12 is controlled by a balance between a load applied when the power element 34 presses the spherical valve 321 and a load applied when the coil spring 325 presses the spherical valve 321.

If the holder member 343 is moved in the direction of the arrow AR02 as described above, a stopper surface 343f provided on a side opposite to the diaphragm 341 side of the holder member 343 in the direction of the uniaxial center CL1 abuts against an abutting surface 30a of the body unit 30 which faces the stopper surface 343f. FIG. 4 illustrates a state where the stopper surface 343f abuts against the abutting surface 30a. That is, the opening degree of the expansion valve 12 shows the maximum opening degree, when the stopper surface 343f abuts against the abutting surface 30a. In a fully closed state of the first refrigerant passage 36 illustrated in FIG. 1, a clearance in the direction of the uniaxial center CL1 is provided between the stopper surface 343f and the abutting surface 30a.

As described above, according to this embodiment, when the power element 34 expands in the direction of the uniaxial center CL1, the diaphragm 341 is pressed, in the direction of the uniaxial center CL1, against the pressing portion 462 of the lid member 46 fixed to the body unit 30. The holder member 343 of the power element 34 is displaced away from the pressing portion 462, as the diaphragm 341 further outwardly expands in the direction of the uniaxial center CL1. The displacement along the direction of the uniaxial center CL1 of the holder member 343 is transmitted to the spherical valve 321, thereby increasing or decreasing the opening degree of the spherical valve 321. Accordingly, it is not necessary to dispose a member corresponding to the temperature-sensing reactive member disclosed in PTL 1, between the holder member 343 and the spherical valve 321. Therefore, complicated processing work for the expansion valve 12 which is caused by providing the member corresponding to the temperature-sensing reactive member can be avoided.

In the direction of the uniaxial center CL1, the side of the power element 34 close to the holder member 343 instead of the side of the power element 34 close to the diaphragm 341 faces the actuating bar 323. Accordingly, the actuating bar 323 can directly abut against the holder member 343. For example, if the actuating bar 323 is intended to abut against the diaphragm 341, in order to prevent the diaphragm 341 from being locally pressed, a member by having a wide surface which comes into surface contact with the diaphragm 341 would be required to interpose between the actuating bar 323 and the diaphragm 341. In this regard, this embodiment has an advantage in that the member which comes into surface contact in this way is not required.

According to this embodiment, the contact surface 343a of the holder member 343 is joined to the outer side of the diaphragm 341 outward of the inner peripheral end 343d (refer to FIG. 5) of the contact surface 343a in the radial direction of the uniaxial center CL1. At the same time, the collar 344 is joined to the outer side of the diaphragm 341 outward of the inner peripheral end 344b (refer to FIG. 5) of the collar contact surface 344a in the radial direction of the uniaxial center CL1.

Figure 5:
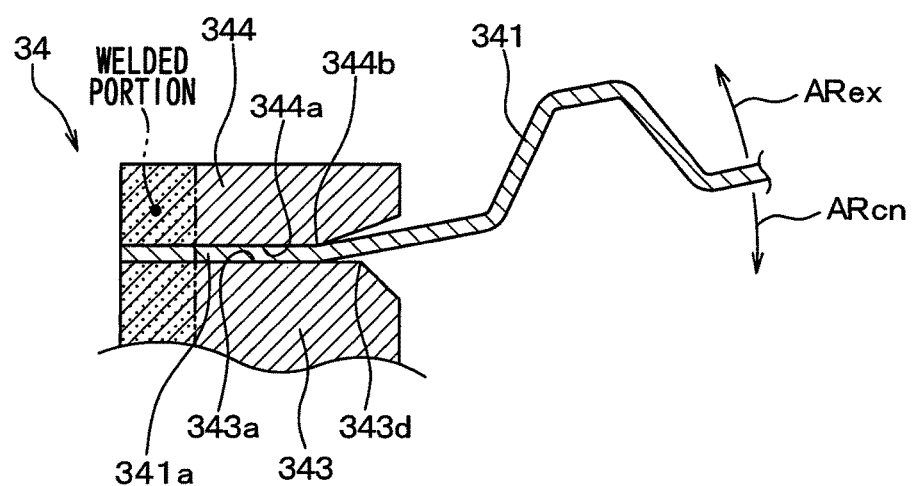
FIG. 5 is an enlarged cross-sectional view illustrating an enlarged portion V in FIG. 3.

For example, in FIG. 5 where the portion V in FIG. 3 is enlarged, when the diaphragm 341 outwardly expands in the direction of the uniaxial center CL1, the diaphragm 341 is bent in a direction of an arrow ARex using the inner peripheral end 344b of the collar contact surface 344a as a fulcrum. On the other hand, when the diaphragm 341 inwardly contracts in the direction of the uniaxial center CL1, the diaphragm 341 is bent in a direction of an arrow ARcn using the inner peripheral end 343d of the contact surface 343a as a fulcrum.

That is, when the diaphragm 341 is deformed, the diaphragm 341 is bent using a position deviated from the welded and joined portion of the diaphragm 341 as a fulcrum. Accordingly, a stress concentration point during the deformation of the diaphragm 341 is away from the above-described joined portion. Therefore, the durability of the diaphragm 341 can be improved.

According to this embodiment, the holder member 343 has the fluid introduction path 343c provided for introducing the fluid mixture of the refrigerant and the inert gas into the closed space 34a. Accordingly, it is not necessary to provide the diaphragm 341 with a communication hole corresponding to the fluid introduction path 343c. Therefore, the fluid introduction path 343c is easily closed so as to prevent the fluid mixture from leaking out.

According to this embodiment, the power element 34 is accommodated inside the body unit 30 by being isolated from the outer space of the expansion valve 12. Accordingly, waterproofing or sound insulating can be easily performed between the expansion valve 12 and a member to be arranged adjacent to the expansion valve 12. An advantageous effect is obtained in that the operation of the power element 34 is less likely to be affected by the outside air temperature around the expansion valve 12. The lid member 46 which isolates the power element 34 from the outer space of the expansion valve 12 is made of a resin. Therefore, for example, compared to a case where the lid member 46 is made of metal, the operation of the power element 34 is further less likely to be affected by the outside air temperature.

According to this embodiment, the actuating bar 323 is restrained in the radial direction of the uniaxial center CL1 with respect to the body unit 30, and one end of the actuating bar 323 is fitted into the fitting hole 343e provided in the holder member 343. Accordingly, the power element 34 can be held with respect to the body unit 30 with a constant posture so that the expanding direction of the power element 34 becomes the axial direction of the actuating bar 323, that is, the direction of the uniaxial center CL1.

Second Embodiment

Next, a second embodiment of this disclosure will be described. In this embodiment, points which are different from those in the above-described first embodiment will be mainly described. Elements which are the same as or equivalent to those in the above-described embodiment will be omitted or simplified in the description. The omission or the simplification is similarly applied to embodiments subsequent to a third embodiment to be described later.

Figure 6:
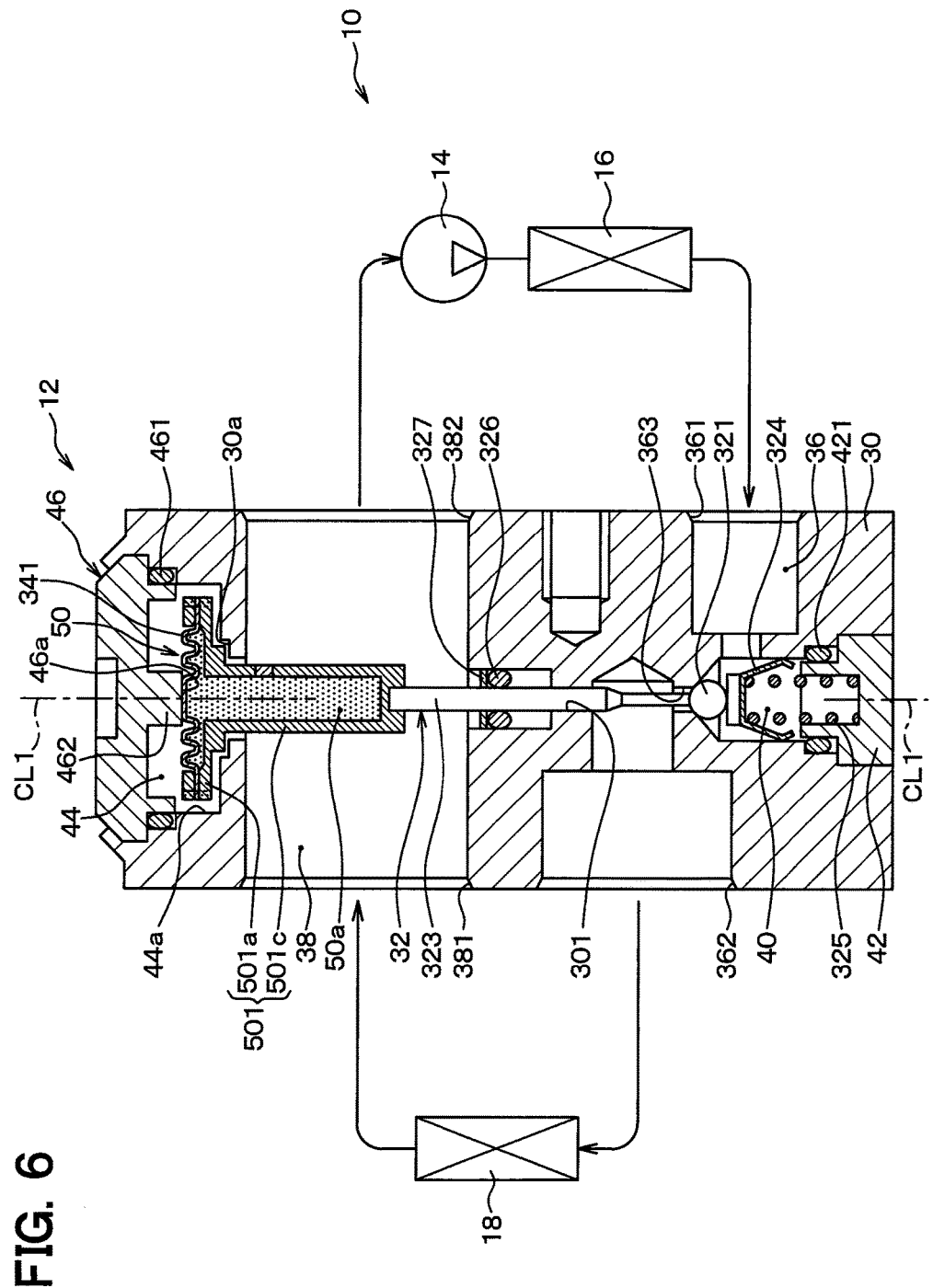
FIG. 6 is a cross-sectional view of the temperature type expansion valve 12 according to a second embodiment.

FIG. 6 is a cross-sectional view of an expansion valve 12 according to this embodiment. As illustrated in FIG. 6, in the expansion valve 12 according to this embodiment, a power element 34 according to the first embodiment is replaced with a power element 50. A length of an actuating bar 323 is shorter than that according to the first embodiment.

Figure 7:
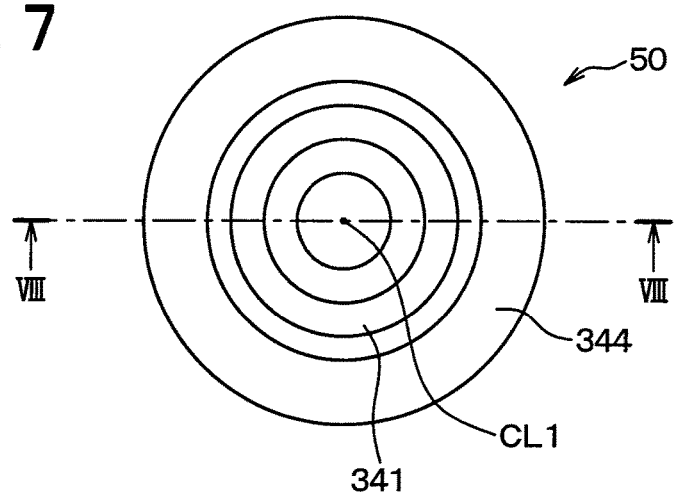
FIG. 7 is a top view of a power element 50 when viewed in the direction of the uniaxial center CL1 in FIG. 6.
Figure 8:
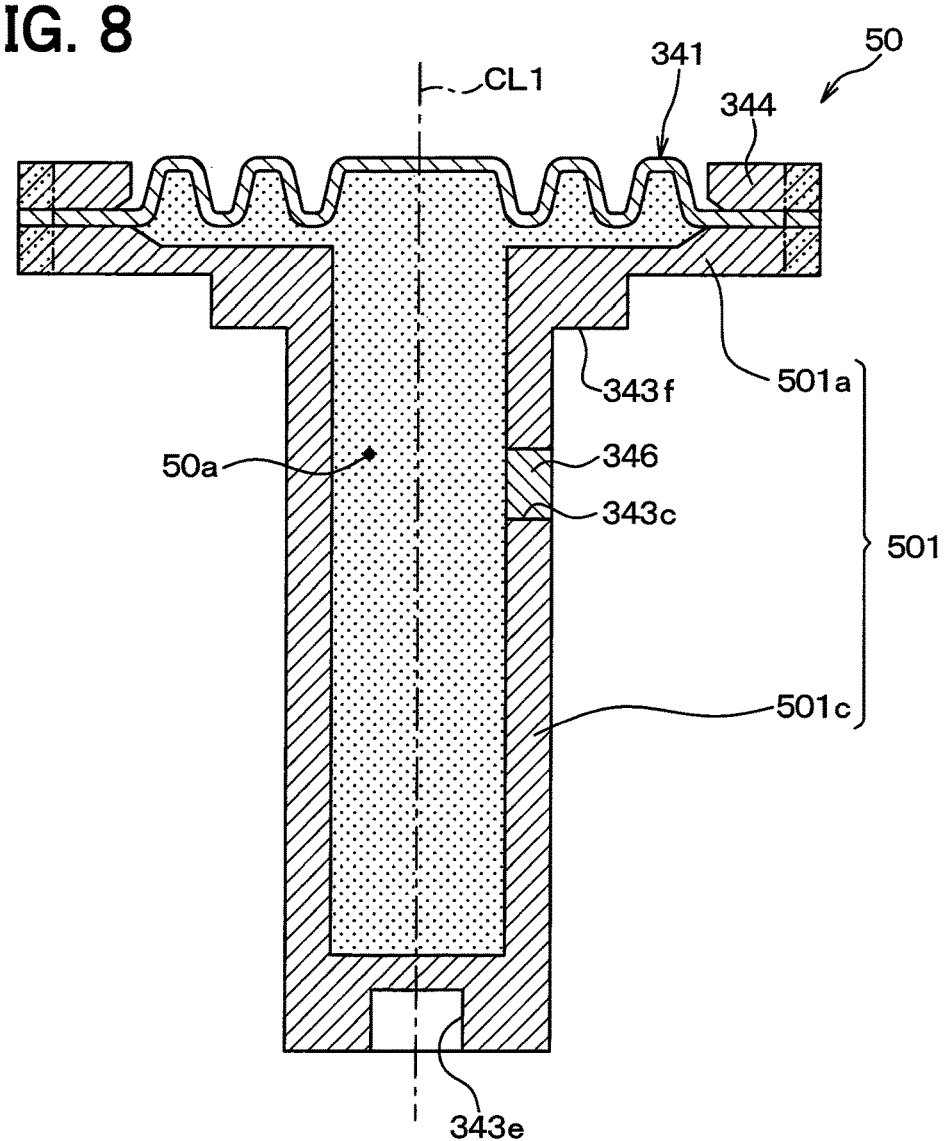
FIG. 8 is a cross-sectional view taken along line XIII-XIII in FIG. 7.

Specifically, the power element 50 according to this embodiment corresponds to the power element 34 according to the first embodiment. Compared to the power element 34, the power element 50 is longer in a direction of a uniaxial center CL1. In detail, the power element 50 according to this embodiment includes a holder member 501 in FIG. 6, instead of a holder member 343 according to the first embodiment, and the holder member 501 is longer than the holder member 343 according to the first embodiment. The power element 50 according to this embodiment has a shape illustrated in FIGS. 7 and 8. FIG. 7 is a top view of the power element 50 according to this embodiment when viewed in the direction of the uniaxial center CL1. FIG. 8 is a cross-sectional view taken along line VIII-VIII in FIG. 7.

As illustrated in FIGS. 7 and 8, similarly to the first embodiment, the power element 50 includes a diaphragm 341 and a collar 344, in addition to the holder member 501. The power element 50 corresponds to an expansion unit according to this disclosure.

The holder member 501 is configured to include a joined portion 501a which is joined to the diaphragm 341 by means of laser welding, and a flow channel arrangement portion 501c which is arranged inside a second refrigerant passage 38 (refer to FIG. 6). The flow channel arrangement portion 501c is a portion which extends from the joined portion 501a, and has a cylindrical shape whose diameter is smaller than that of the joined portion 501a. Similarly to the first embodiment, a closed space 50a is provided between the diaphragm 341 and the joined portion 501a of the holder member 501. However, unlike the first embodiment, the closed space 50a is provided so as to extend up to the flow channel arrangement portion 501c.

Similarly to the closed space 34a according to the first embodiment, the closed space 50a of the power element 50 is a fluid enclosing space having the above-described fluid mixture enclosed therein. A fluid introduction path 343c for introducing the fluid mixture into the closed space 50a is provided in the flow channel arrangement portion 501c. Similarly to the first embodiment, after the fluid mixture is introduced into the closed space 50a, the fluid introduction path 343c is closed by a plug 346.

In this embodiment, the fitting hole 343e is provided in a distal end of the flow channel arrangement portion 501c. Similarly to the first embodiment, one end of the actuating bar 323 (refer to FIG. 6) is fitted to the fitting hole 343e.

As illustrated in FIG. 6, the power element 50 is arranged so that the flow channel arrangement portion 501c of the holder member 501 is located inside the second refrigerant passage 38 after crossing a refrigerant flow in the second refrigerant passage 38. In this manner, the refrigerant flowing in the second refrigerant passage 38 flows downstream while directly coming into contact with the power element 50. Accordingly, compared to the first embodiment, the power element 50 can be more accurately operated in accordance with a refrigerant temperature in the second refrigerant passage 38.

The closed space 50a having the fluid mixture enclosed therein is provided so as to extend to the flow channel arrangement portion 501c. Accordingly, compared to a configuration (refer to FIG. 24) in which the closed space 50a does not extend to the flow channel arrangement portion 501c, the refrigerant temperature in the second refrigerant passage 38 is easily transferred to the fluid mixture inside the closed space 50a. Therefore, the power element 50 can be accurately operated in accordance with the refrigerant temperature in the second refrigerant passage 38.

Third Embodiment

Next, a third embodiment of this disclosure will be described. In this embodiment, points which are different from those in the above-described second embodiment will be mainly described.

Figure 9:
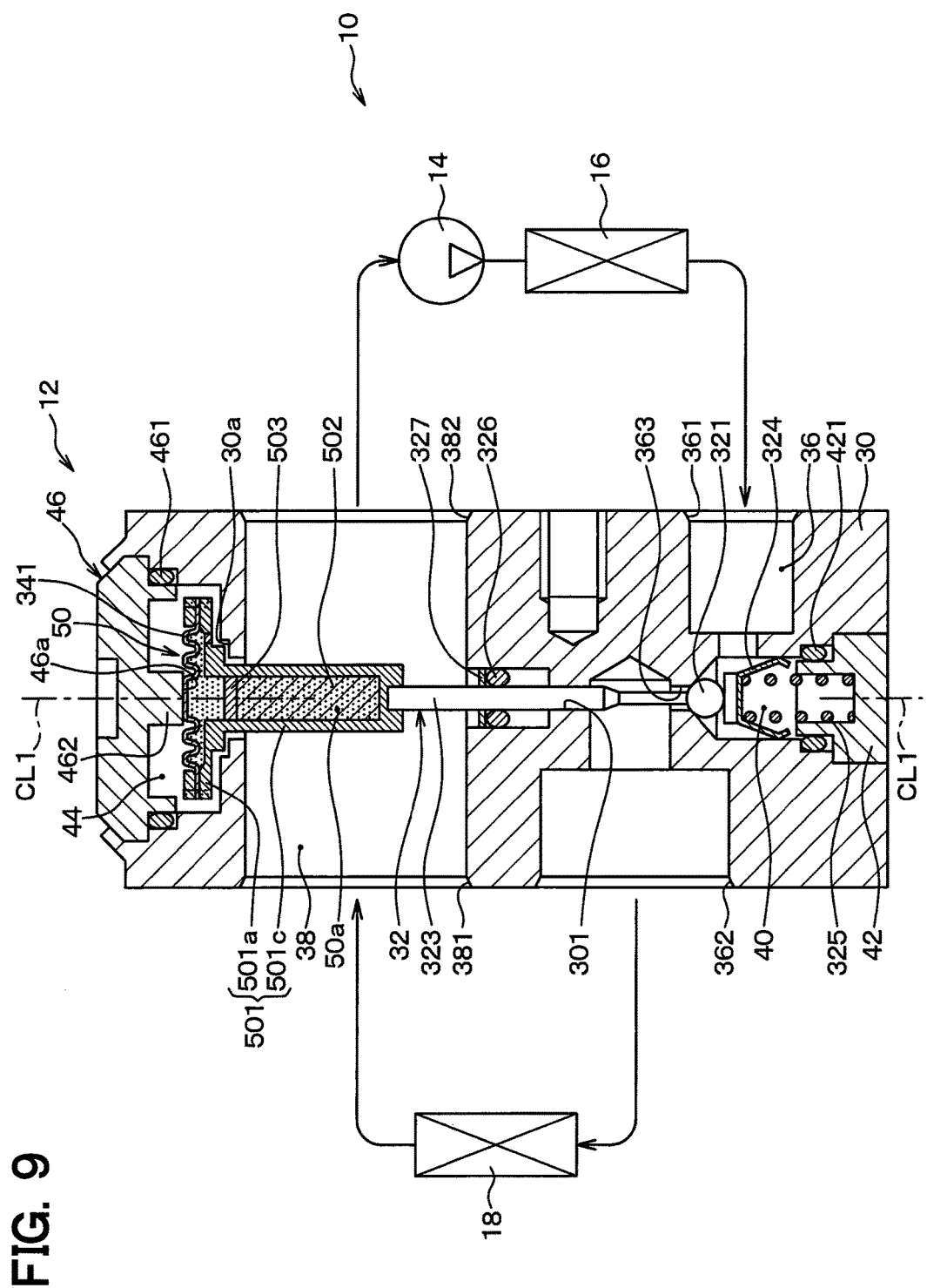
FIG. 9 is a cross-sectional view of the temperature type expansion valve 12 according to a third embodiment.

FIG. 9 is a cross-sectional view of an expansion valve 12 according to this embodiment. As illustrated in FIG. 9, the expansion valve 12 according to this embodiment has a power element 50 which is different from that of the expansion valve 12 according to the second embodiment. A top view obtained when the power element 50 according to this embodiment is viewed in a direction of a uniaxial center CL1 is FIG. 7 which is the same as that of the second embodiment. In this embodiment, a cross-sectional view taken along line VIII-VIII in FIG. 7 is FIG. 10 instead of FIG. 8.

Figure 10:
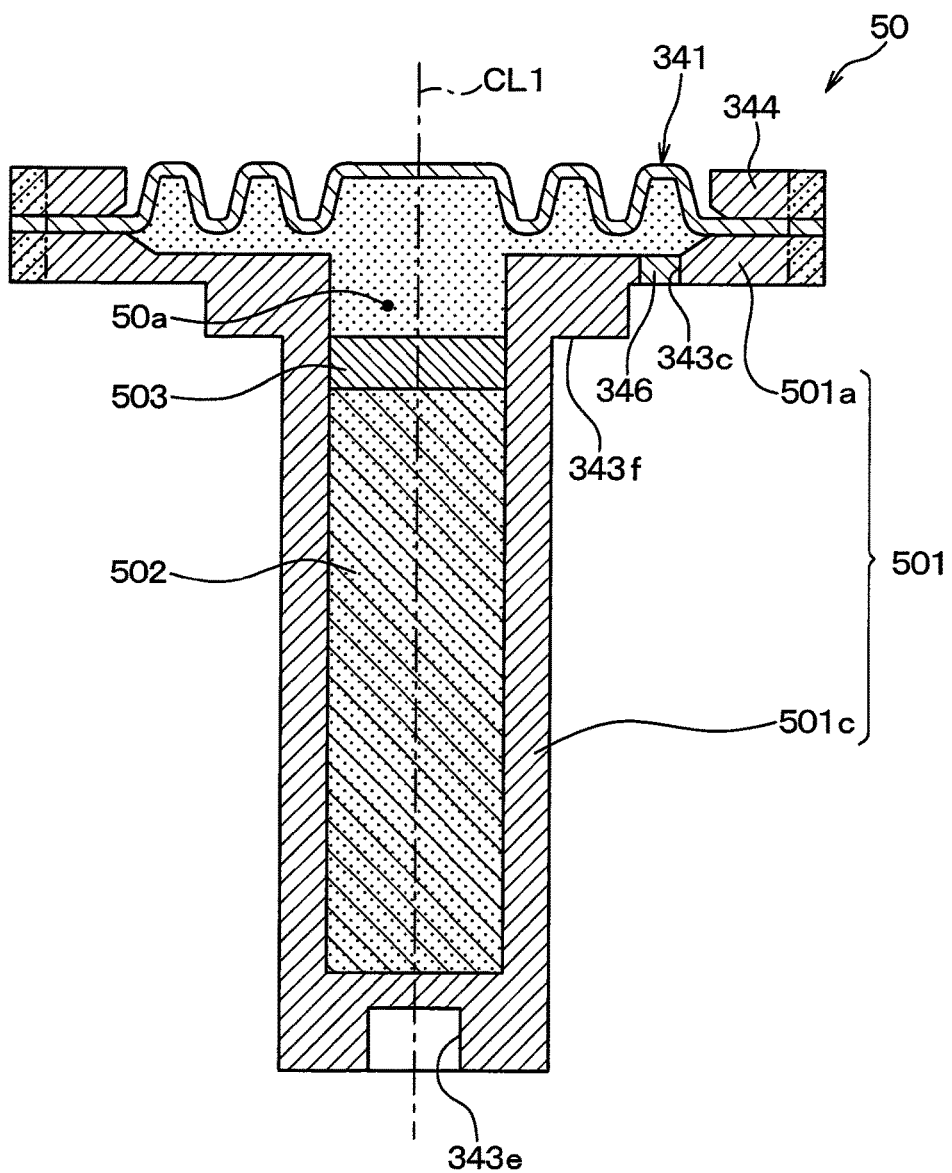
FIG. 10 is a cross-sectional view taken along line VIII-VIII in FIG. 7 according to the third embodiment.

As illustrated in FIGS. 9 and 10, compared to the second embodiment, specifically, the power element 50 according to this embodiment further includes an adsorbent 502 and a holding member 503.

The adsorbent 502 adsorbs or radiates heat of the refrigerant enclosed in the closed space 50a in accordance with a temperature of the adsorbent 502. For example, the adsorbent 502 is configured to include activated carbon whose thermal conductivity is worse than the holder member 501. The adsorbent 502 is disposed inside a portion of the closed space 50a of the power element 50 included in the flow channel arrangement portion 501c. The adsorbent 502 is held by the holding member 503 so as not to flow out toward the joined portion 501a. The holding member 503 is a member having air permeability, and is configured to include a metal mesh or a filter, for example.

According to this embodiment, the adsorbent 502 is disposed inside the power element 50. Accordingly, an operation response of the power element 50 to a temperature change in the refrigerant flowing in the second refrigerant passage 38 slows down. Therefore, a sensitive operation of the power element 50 can be restricted.

Fourth Embodiment

Next, a fourth embodiment of this disclosure will be described. In this embodiment, points which are different from those in the above-described second embodiment will be mainly described.

Figure 11:
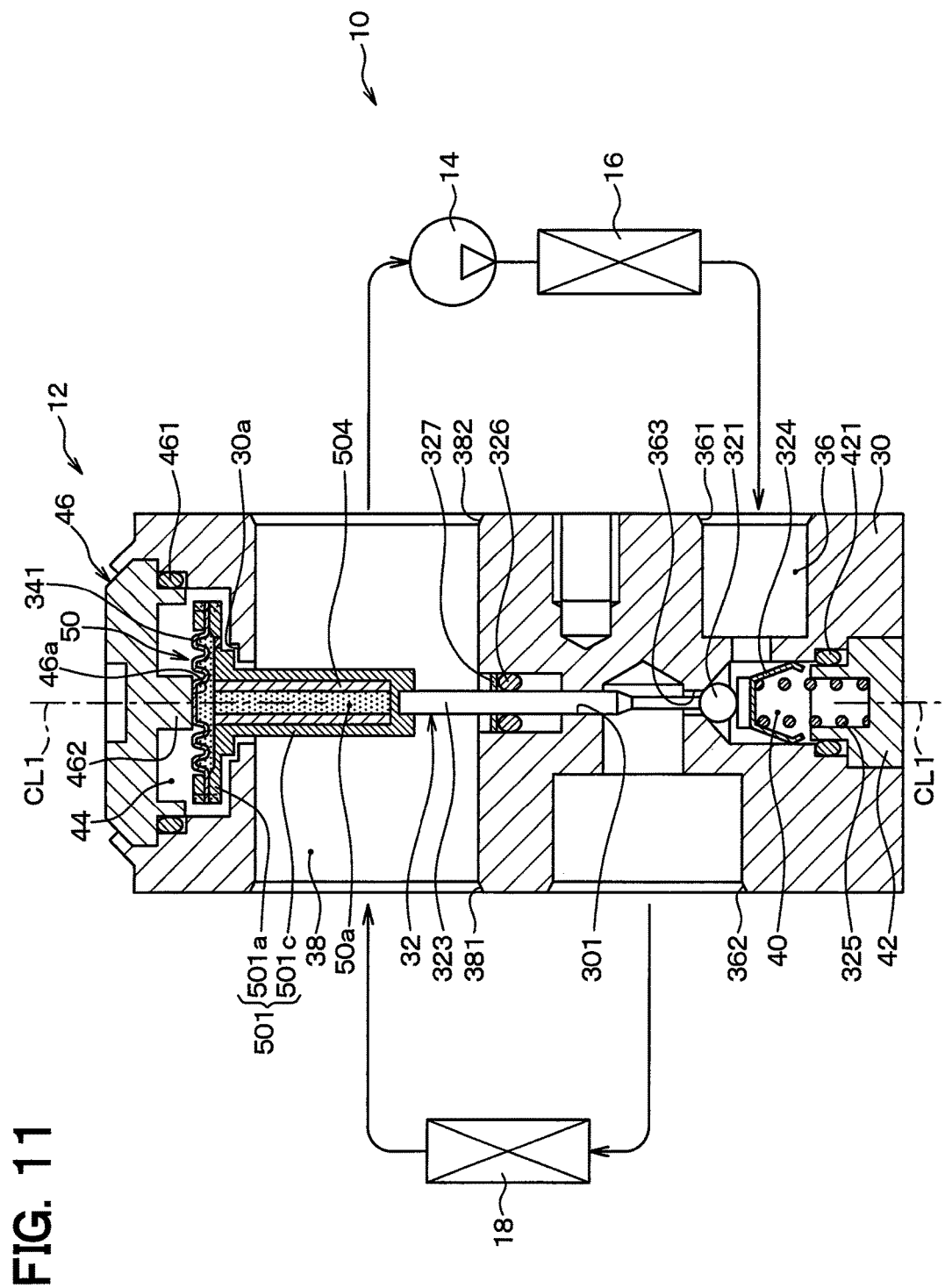
FIG. 11 is a cross-sectional view of the temperature type expansion valve 12 according to a fourth embodiment.

FIG. 11 is a cross-sectional view of an expansion valve 12 according to this embodiment. As illustrated in FIG. 11, the expansion valve 12 according to this embodiment has a power element 50 which is different from that of the expansion valve 12 according to the second embodiment. A top view obtained when the power element 50 according to this embodiment is viewed in a direction of a uniaxial center CL1 is FIG. 7 which is the same as that of the second embodiment. In this embodiment, a cross-sectional view taken along line VIII-VIII in FIG. 7 is FIG. 12 instead of FIG. 8.

Figure 12:
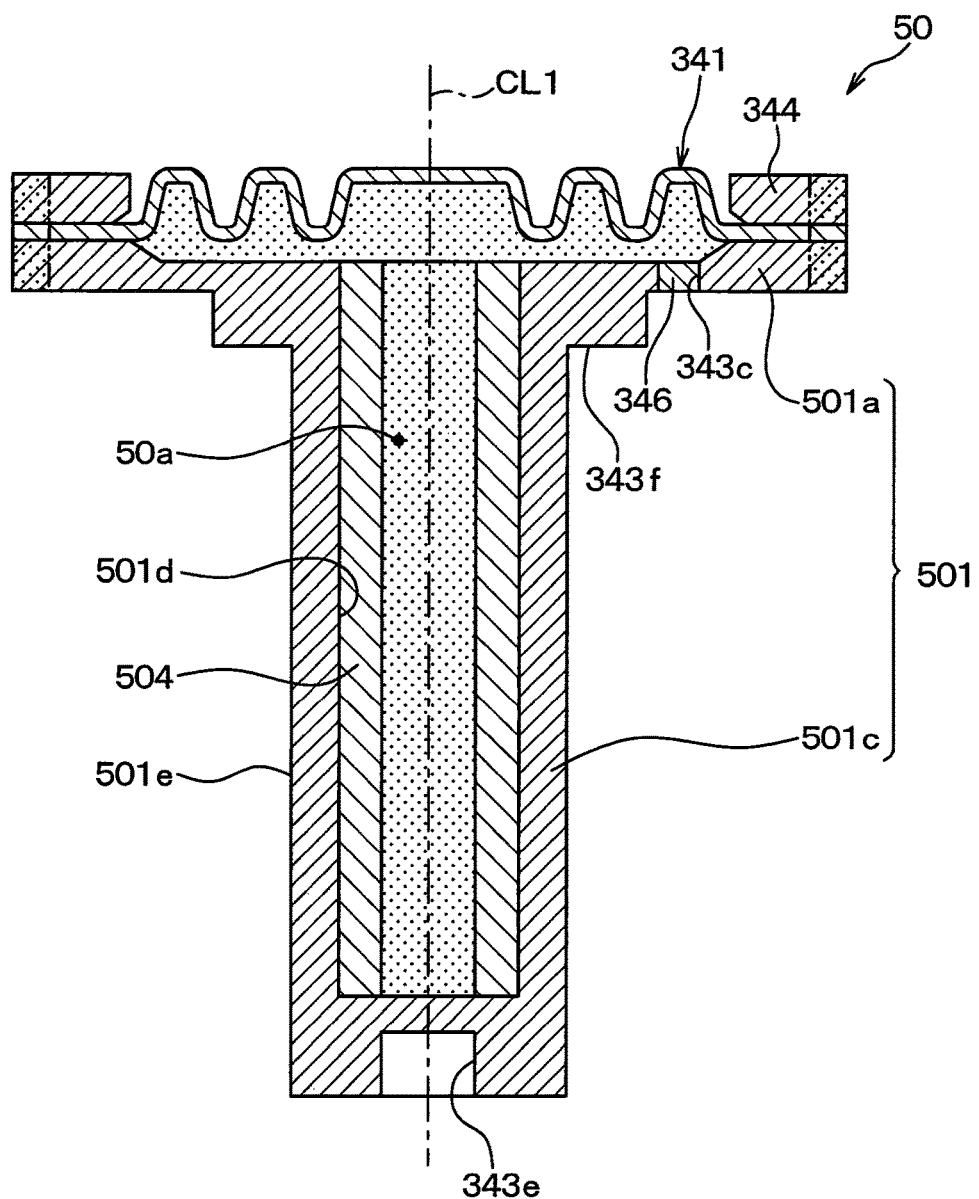
FIG. 12 is a cross-sectional view taken along line VIII-VIII in FIG. 7 according to the fourth embodiment.

As illustrated in FIGS. 11 and 12, specifically, compared to the second embodiment, the power element 50 according to this embodiment further includes a wall member 504.

The wall member 504 is configured to include a material whose thermal conductivity is lower than a holder member 501 made of metal, for example, a resin, and is molded into a cylindrical shape. The wall member 504 is fitted into a flow channel arrangement portion 501c having a cylindrical shape. Therefore, an inner peripheral surface 501d of the flow channel arrangement portion 501c is covered with the wall member 504.

According to this embodiment, the inner peripheral surface 501d of the flow channel arrangement portion 501c is covered with the wall member 504 whose thermal conductivity is low. Accordingly, similarly to the above-described third embodiment, a sensitive operation of the power element 50 can be restricted.

Fifth Embodiment

Next, a fifth embodiment of this disclosure will be described. In this embodiment, points which are different from those in the above-described first embodiment will be mainly described.

Figure 13:
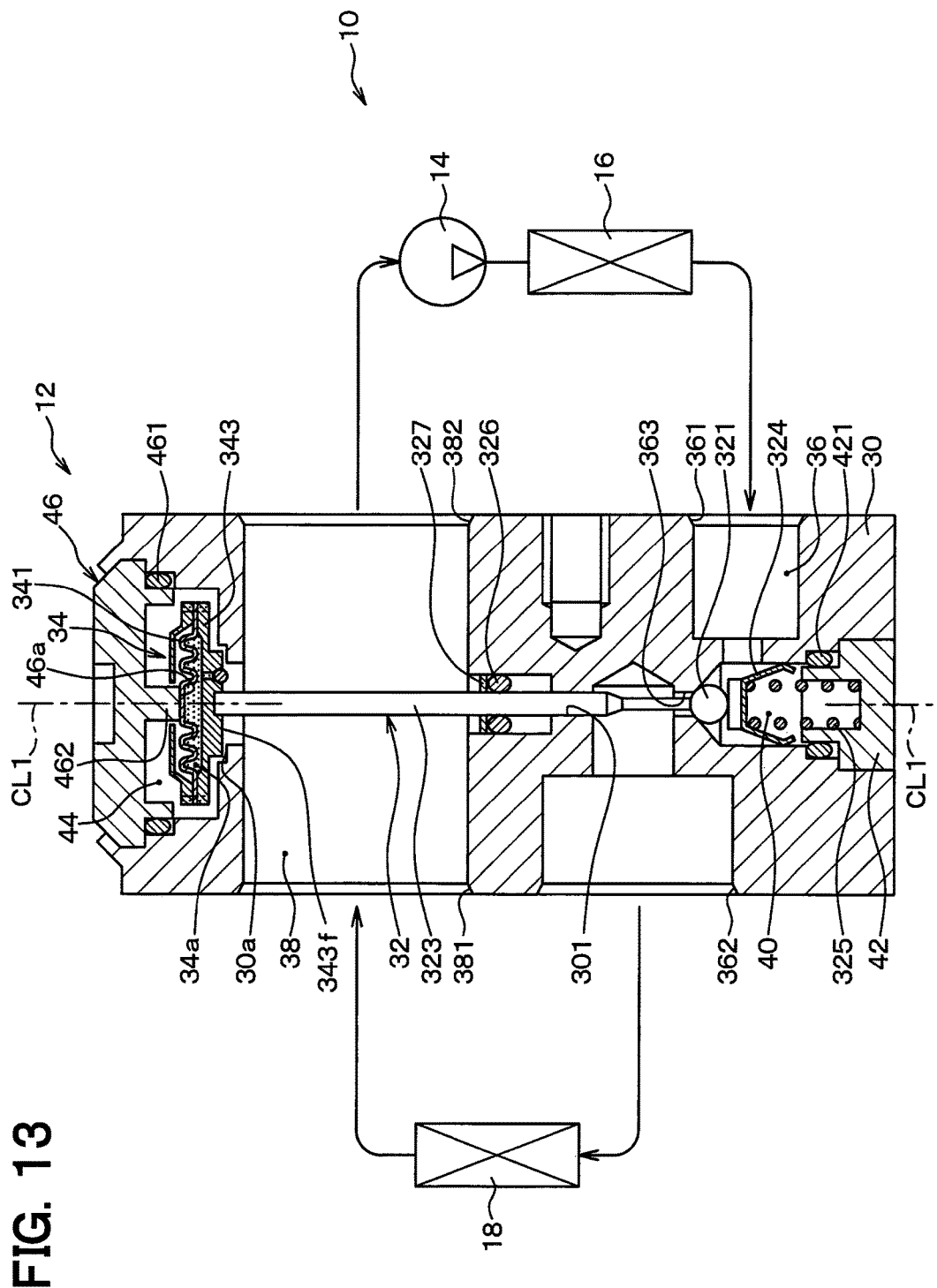
FIG. 13 is a cross-sectional view of the temperature type expansion valve 12 according to a fifth embodiment.
Figure 14:
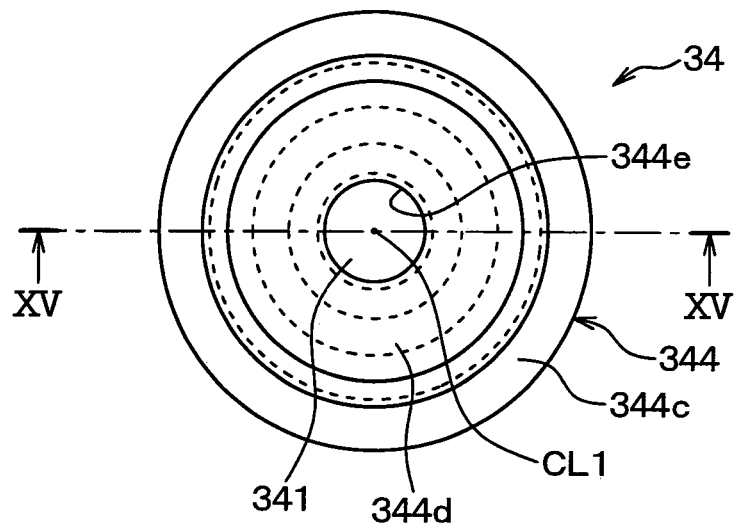
FIG. 14 is a top view of the power element 34 according to the fifth embodiment when viewed in the direction of the uniaxial center CL1.
Figure 15:
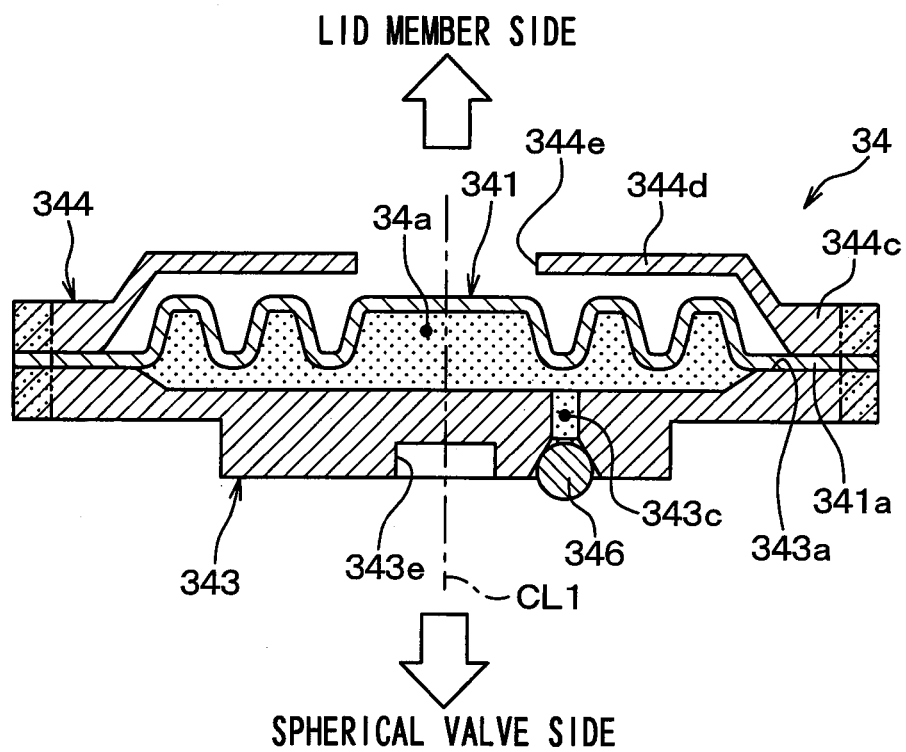
FIG. 15 is a cross-sectional view taken along line XV-XV in FIG. 14.

FIG. 13 is a cross-sectional view of an expansion valve 12 according to this embodiment. As illustrated in FIG. 13, the expansion valve 12 according to this embodiment has a power element 34 which is different from that of the expansion valve 12 according to the first embodiment. In detail, a collar 344 (refer to FIG. 15) is different from that according to the first embodiment. FIGS. 14 and 15 illustrate a detailed view of the power element 34 illustrated in FIG. 13. FIG. 14 is a top view of the power element 34 according to this embodiment when viewed in a direction of a uniaxial center CL1. FIG. 15 is a cross-sectional view taken along line XV-XV in FIG. 14.

As illustrated in FIGS. 14 and 15, the collar 344 includes a diaphragm pressing portion 344c which pinches and fixes a peripheral edge portion 341a of a diaphragm 341 using a holder member 343, and an extension portion 344d which extends radially inward from the diaphragm pressing portion 344c. The extension portion 344d corresponds to a prohibiting portion according to this disclosure.

As is understood from FIG. 15, the diaphragm pressing portion 344c corresponds to the overall collar 344 according to the first embodiment. Accordingly, in the collar 344 according to this embodiment, the extension portion 344d is added to the collar 344 according to the first embodiment.

As illustrated in FIGS. 14 and 15, a central portion of the extension portion 344d has a through-hole 344e provided so as not to hinder the diaphragm 341 from coming into contact with a pressing portion 462 (refer to FIG. 13) of a lid member 46.

The extension portion 344d of the collar 344 is arranged so as to come into contact with the diaphragm 341 if the diaphragm 341 expands to some extent. The diaphragm 341 is limited by the extension portion 344d so as not to expand beyond a contact state thereof, if the diaphragm 341 expands until the diaphragm 341 comes into contact with the extension portion 344d.

That is, the extension portion 344d has a function of limiting expansion and deformation of the diaphragm 341. Therefore, the extension portion 344d can restrict the deformation of the diaphragm 341 so as not to impair the durability. For example, in a case where the power element 34 is present alone in a manufacturing process of the power element 34, the deformation of the diaphragm 341 is not restricted by the lid member 46. Therefore, particularly in this case, the extension portion 344d is effectively used.

This embodiment can also be combined with any one of the above-described second to fourth embodiments.

Sixth Embodiment

Next, a sixth embodiment of this disclosure will be described. In this embodiment, points which are different from those in the above-described second embodiment will be mainly described.

Figure 16:
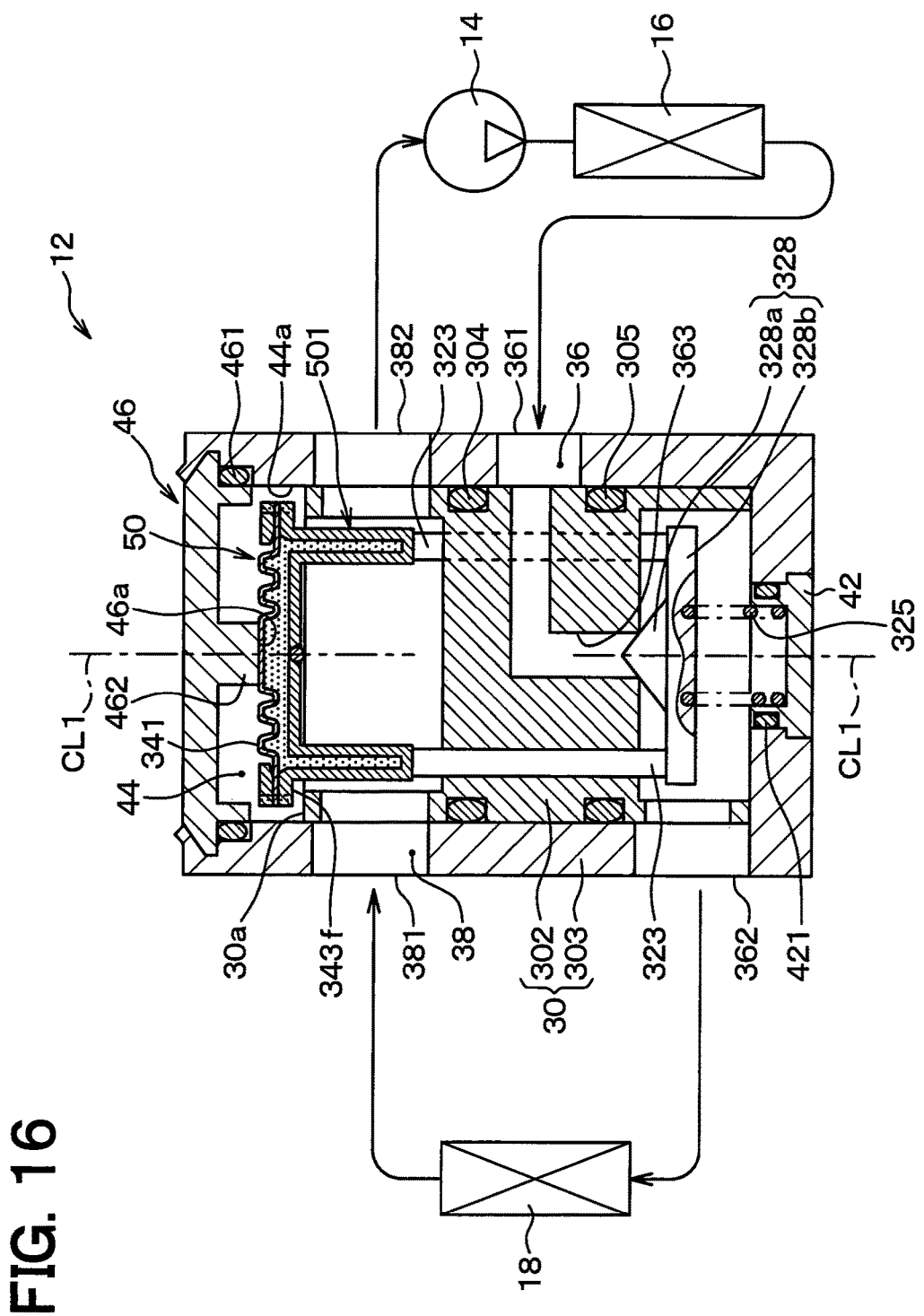
FIG. 16 is a cross-sectional view of the temperature type expansion valve 12 according to a sixth embodiment.

FIG. 16 is a cross-sectional view of an expansion valve 12 according to this embodiment. As illustrated in FIG. 16, the expansion valve 12 according to this embodiment is different from that according to the second embodiment in that multiple flow channel arrangement portions 501c are disposed and multiple actuating bars 323 are also disposed.

A body unit 30 according to this embodiment is configured to include two components as illustrated in FIG. 16, and is configured to include a first body member 302 and a second body member 303. The first body member 302 is fitted into the second body member 303. The first body member 302 and the second body member 303 are integrated with each other in this manner, thereby providing a first refrigerant passage 36 and a second refrigerant passage 38 in the body unit 30.

The expansion valve 12 according to this embodiment includes a valve body 328 instead of a spherical valve 321 according to the second embodiment, as a valve body which opens or closes a throttle passage 363. The valve body 328 includes a conical portion 328a which has a conical shape and increases or decreases a refrigerant passage area of the throttle passage 363, and a support portion 328b which is configured to be integrated with the conical portion 328a and receives a load from an actuating bar 323 and a coil spring 325. The coil spring 325 biases the conical portion 328a to a side pressed against the throttle passage 363 via the support portion 328b. That is, the coil spring 325 biases the valve body 328 in a valve closing direction.

O-rings 304 and 305 are disposed between the first body member 302 and the second body member 303. The O-ring 304 prevents a leaking refrigerant from flowing between the first refrigerant passage 36 and the second refrigerant passage 38. The O-ring 305 prevents the leaking refrigerant from flowing between an upstream side and a downstream side with respect to the valve body 328 in a refrigerant flow inside the first refrigerant passage 36.

Figure 17:
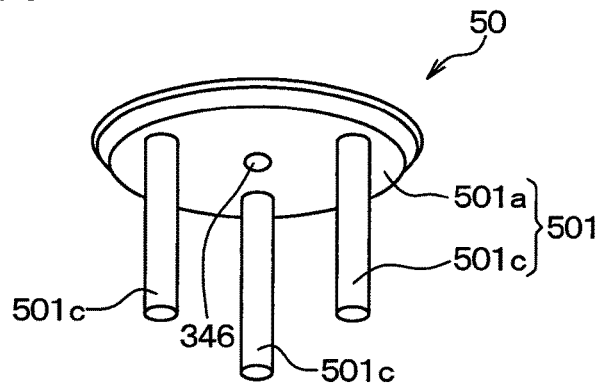
FIG. 17 is a perspective view when the power element 50 according to the sixth embodiment is viewed from the spherical valve 321 side.
Figure 18:
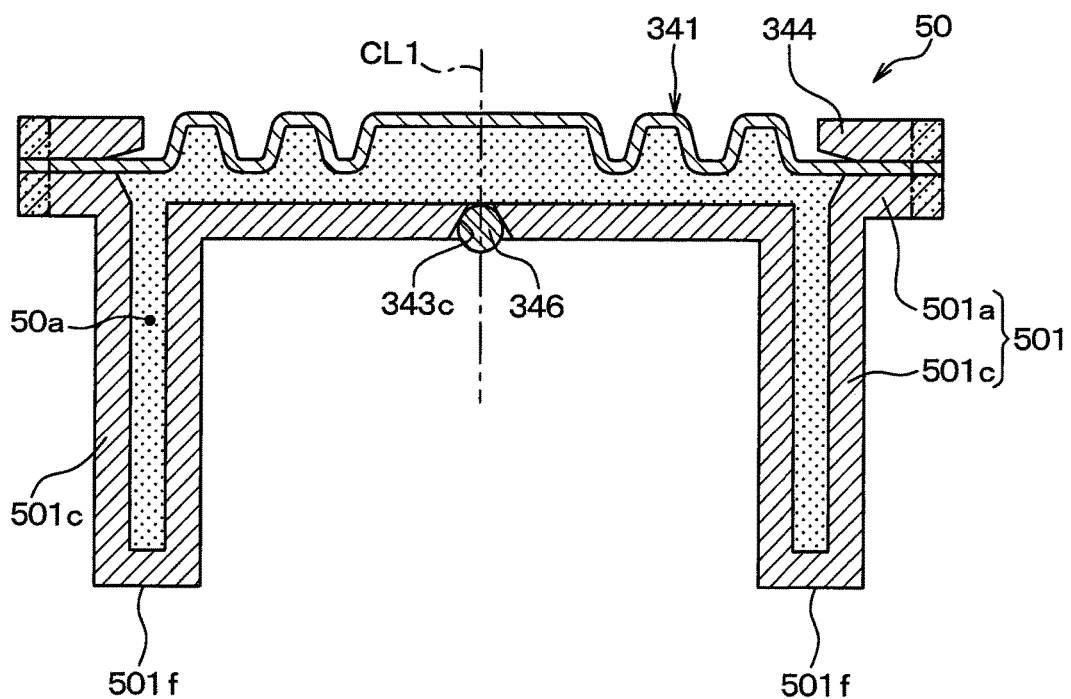
FIG. 18 is a detailed cross-sectional view of the power element 50 which is illustrated by removing the power element 50 from FIG. 16.

The power element 50 includes multiple flow channel arrangement portions 501c, and all of the multiple flow channel arrangement portions 501c are arranged inside the second refrigerant passage 38. FIGS. 17 and 18 illustrate a detailed view of the power element 50. FIG. 17 is a perspective view when the power element 50 according to this embodiment is viewed from the spherical valve 321 side. FIG. 18 is a detailed cross-sectional view of the power element 50 which is illustrated by removing the power element 50 from FIG. 16.

As illustrated in FIGS. 17 and 18, the flow channel arrangement portion 501c is disposed at three locations. The three flow channel arrangement portions 501c are disposed in parallel with each other along the uniaxial center CL1, and are arranged side by side in an annular shape formed around the uniaxial center CL1. Each one end of the actuating bars 323 (refer to FIG. 16) abuts against a distal end 501f of the flow channel arrangement portions 501c. That is, the three actuating bars 323 are also arranged side by side in an annular shape formed around the uniaxial center CL1. As illustrated in FIG. 16, the other end of the actuating bars 323 abuts against the support portion 328b of the valve body 328. According to this configuration, if the diaphragm 341 expands and the holder member 501 is displaced toward the valve body 328 in the direction of the uniaxial center CL1, the three actuating bars 323 prevail against a biasing force of the coil spring 325, thereby displacing the valve body 328 in a valve opening direction. That is, the three actuating bars 323 function as a displacement transmitting portion which transmits displacement in the direction of the uniaxial center CL1 of the holder member 501 of the power element 50 to the valve body 328.

According to this embodiment, the holder member 501 of the power element 50 has the multiple flow channel arrangement portions 501c. Accordingly, even if the refrigerant temperature inside the first refrigerant passage 36 fluctuates, the valve body 328 can be operated in accordance with the refrigerant temperature in the first refrigerant passage 36 so as to reduce influences caused by the fluctuations.

According to this embodiment, the multiple actuating bars 323 are interposed between the holder member 501 and the valve body 328 in the direction of the uniaxial center CL1, and are arranged in parallel with each other. Accordingly, the actuating bars 323 can be disposed so that the actuating bars 323 are not inserted into the throttle passage 363.

This embodiment can be combined with the above-described fifth embodiment. Similarly to the fifth embodiment, the collar 344 according to this embodiment can include the extension portion 344d (refer to FIG. 15). This embodiment can also be combined with the above-described third embodiment or the above-described fourth embodiment.

Seventh Embodiment

Next, a seventh embodiment of this disclosure will be described. In this embodiment, points which are different from those in the above-described sixth embodiment will be mainly described.

Figure 19:
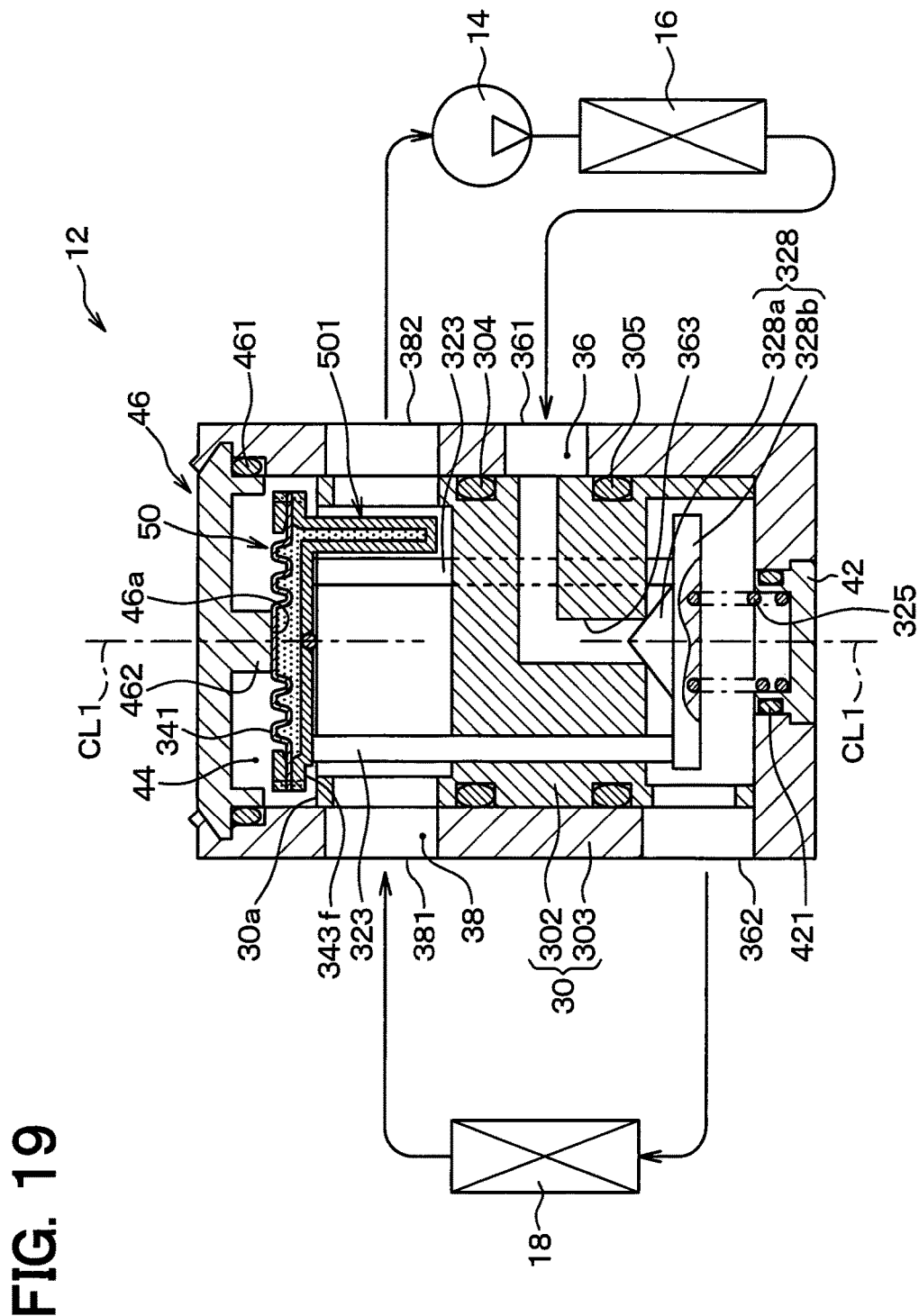
FIG. 19 is a cross-sectional view of the temperature type expansion valve 12 according to a seventh embodiment.

FIG. 19 is a cross-sectional view of an expansion valve 12 according to this embodiment. As illustrated in FIG. 19, the expansion valve 12 according to this embodiment is different from that according to the sixth embodiment in that one flow channel arrangement portion 501c is provided.

Figure 20:
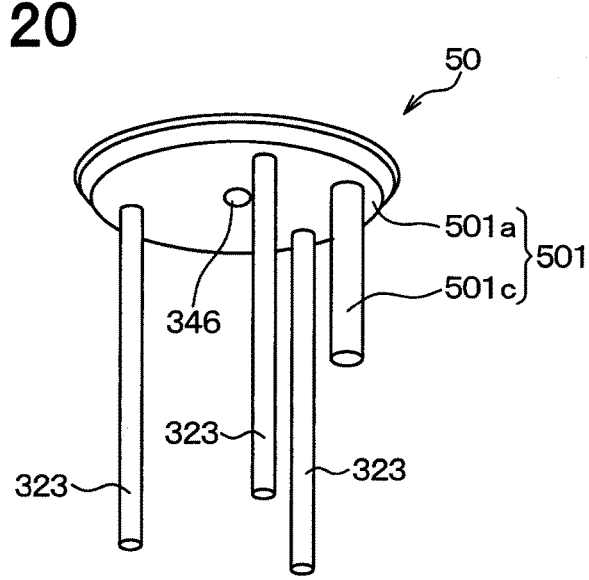
FIG. 20 is a perspective view when the power element 50 and three actuating bars 323 according to the seventh embodiment are viewed from the spherical valve 321 side.
Figure 21:
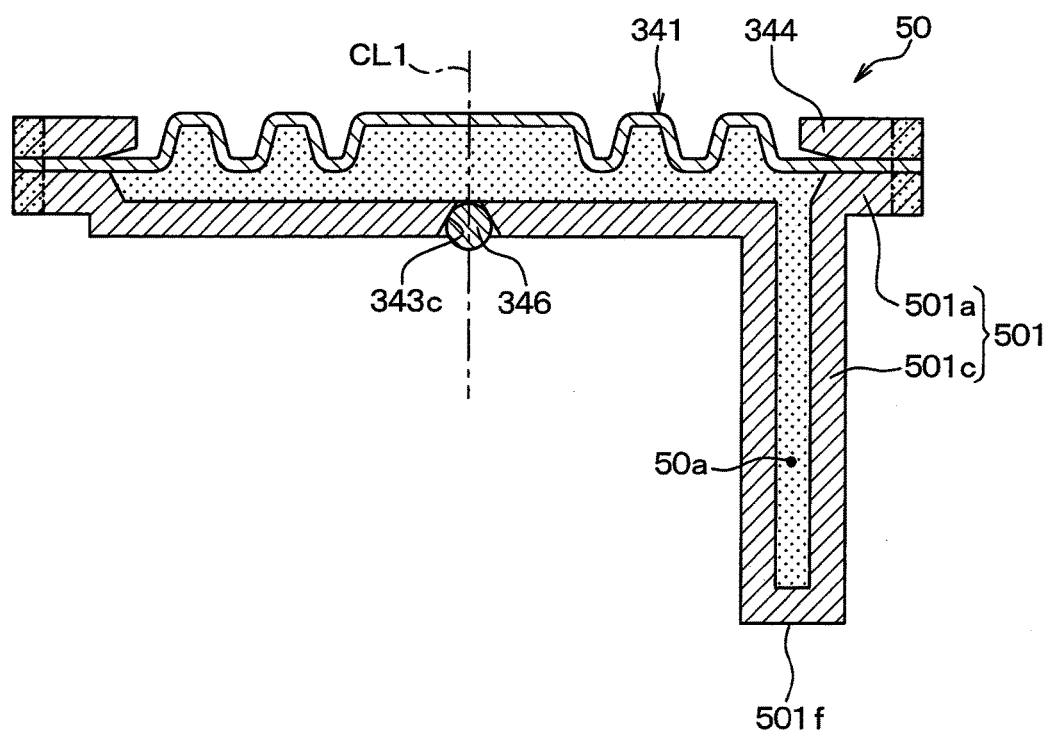
FIG. 21 is a detailed cross-sectional view of the power element 50 which is illustrated by removing the power element 50 from FIG. 19.

FIG. 20 is a perspective view when a power element 50 and three actuating bars 323 according to this embodiment are viewed from a side of a spherical valve 321. FIG. 21 is a detailed cross-sectional view of the power element 50 which is illustrated by removing the power element 50 from FIG. 19.

As illustrated in FIGS. 19 to 21, similarly to the sixth embodiment, the three actuating bars 323 are arranged in an annular shape formed around a uniaxial center CL1. However, the flow channel arrangement portion 501c of the power element 50 is disposed at one location. Accordingly, each one end of the actuating bars 323 abuts against a joined portion 501a instead of the flow channel arrangement portion 501c.

This embodiment can be combined with the above-described fifth embodiment. Similarly to the fifth embodiment, the collar 344 according to this embodiment can include the extension portion 344d (refer to FIG. 15). This embodiment can also be combined with the above-described third embodiment or the above-described fourth embodiment.

Eighth Embodiment

Next, an eighth embodiment of this disclosure will be described. In this embodiment, points which are different from those in the above-described sixth embodiment will be mainly described.

Figure 22:
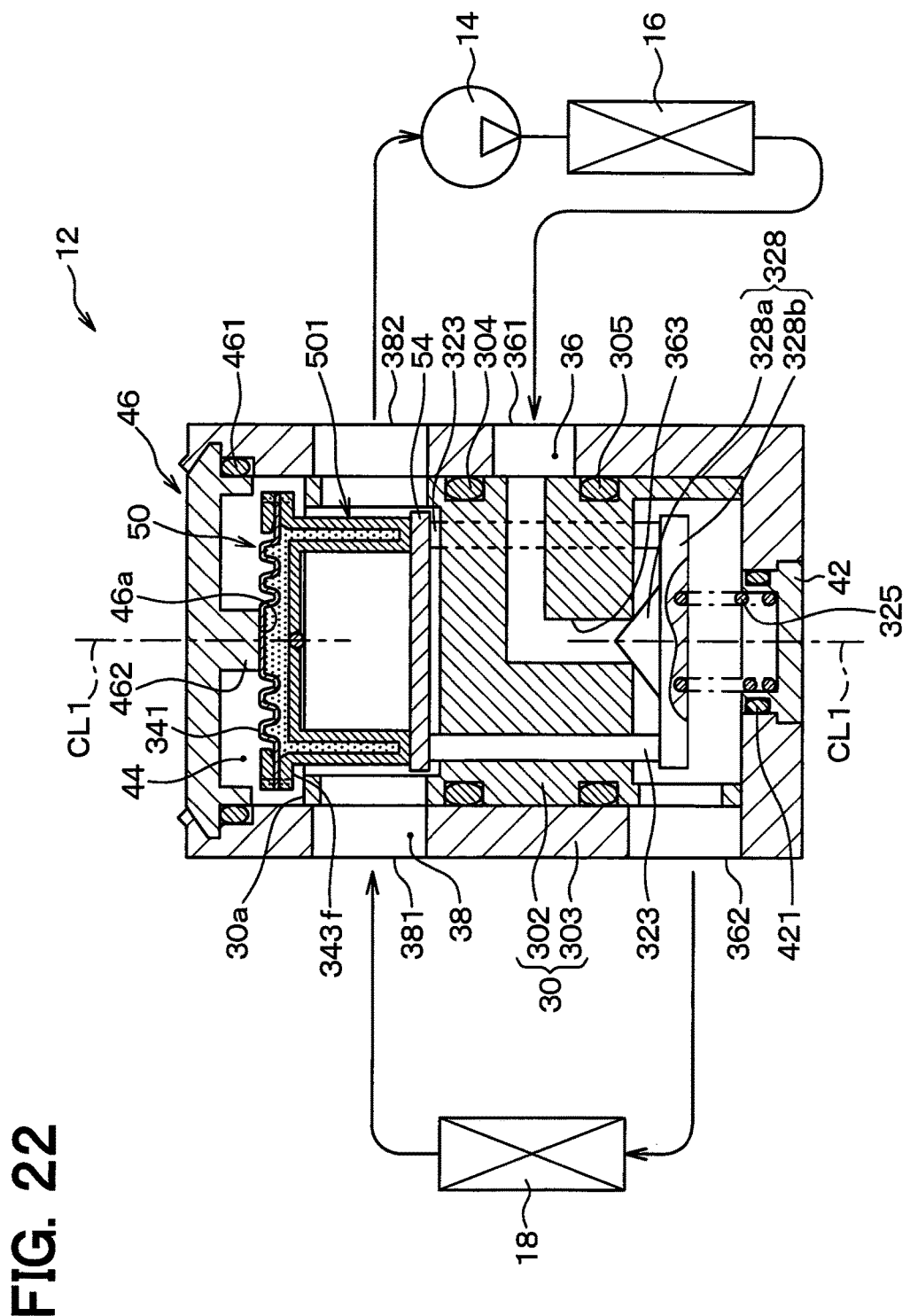
FIG. 22 is a cross-sectional view of the temperature type expansion valve 12 according to an eighth embodiment.

FIG. 22 is a cross-sectional view of an expansion valve 12 according to this embodiment. As illustrated in FIG. 22, the expansion valve 12 according to this embodiment is different from that according to the sixth embodiment in that an interposing member 54 is provided.

The expansion valve 12 includes the interposing member 54, and the interposing member 54 is a flat plate-shaped member. A distal end 501f (refer to FIG. 18) of a flow channel arrangement portion 501c abuts against one surface side of the interposing member 54. On the other hand, one end of an actuating bar 323 abuts against the other surface side of the interposing member 54. Therefore, if a power element 50 expands in a direction of a uniaxial center CL1, a holder member 501 presses the actuating bar 323 via the interposing member 54.

According to this embodiment, the interposing member 54 is interposed between the flow channel arrangement portion 501c and the actuating bar 323. Accordingly, the actuating bar 323 is not required to abut against the distal end 501f (refer to FIG. 18) of the flow channel arrangement portion 501c. Therefore, during an assembly process of the expansion valve 12, the flow channel arrangement portion 501c is not required to be aligned with the actuating bar 323. An outer diameter of the interposing member 54 is caused to be larger than an outer diameter of the power element 50, thereby enabling the actuating bar 323 to be disposed on an outer side in the radial direction of the uniaxial center CL1 with respect to the outer diameter of the power element 50.

This embodiment can be combined with the above-described fifth embodiment. Similarly to the fifth embodiment, the collar 344 according to this embodiment can include the extension portion 344d (refer to FIG. 15). This embodiment can also be combined with the above-described third embodiment or the above-described fourth embodiment.

Ninth Embodiment

Next, a ninth embodiment of this disclosure will be described. In this embodiment, points which are different from those in the above-described second embodiment will be mainly described.

Figure 23:
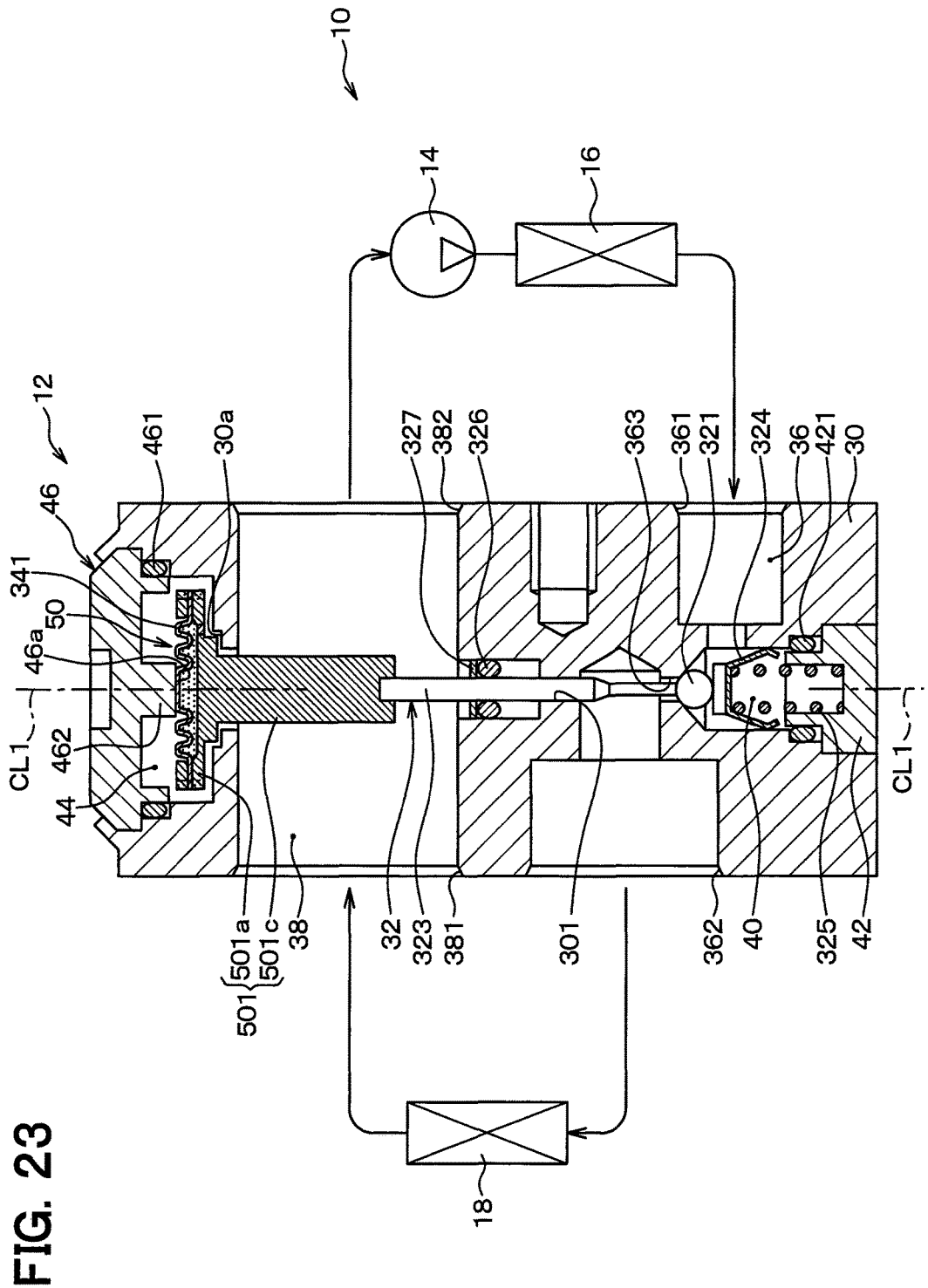
FIG. 23 is a cross-sectional view of the temperature type expansion valve 12 according to a ninth embodiment.

FIG. 23 is a cross-sectional view of an expansion valve 12 according to this embodiment. As illustrated in FIG. 23, the expansion valve 12 according to this embodiment has a power element 50 which is different from that of the expansion valve 12 according to the second embodiment. A top view obtained when the power element 50 according to this embodiment is viewed in a direction of a uniaxial center CL1 is FIG. 7 which is the same as that of the second embodiment. In this embodiment, a cross-sectional view taken along line VIII-VIII in FIG. 7 is FIG. 24 instead of FIG. 8.

Figure 24:
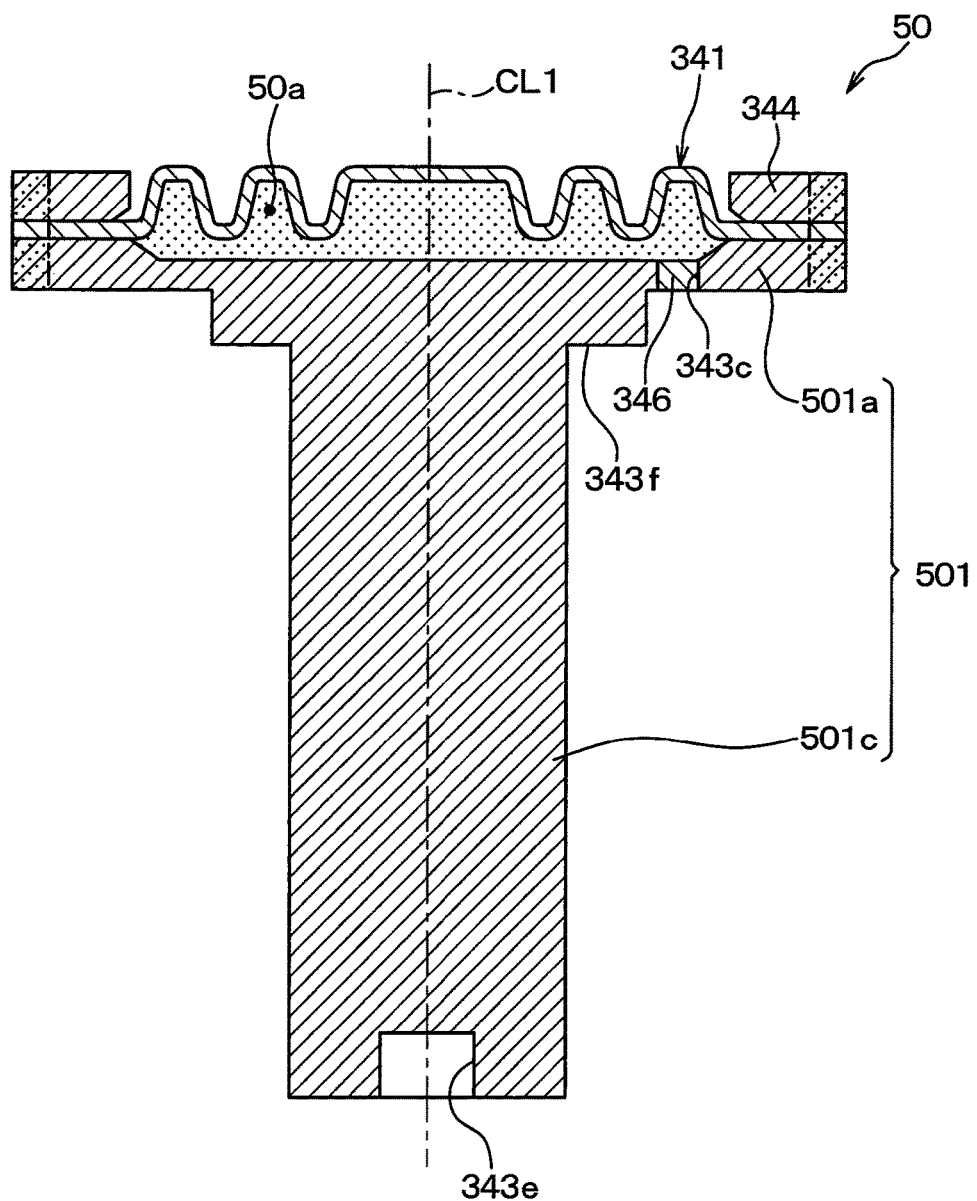
FIG. 24 is a cross-sectional view taken along line VIII-VIII in FIG. 7 according to the ninth embodiment.

As illustrated in FIGS. 23 and 24, specifically in the power element 50 according to this embodiment, a closed space 50a having a fluid mixture enclosed therein is not provided in a flow channel arrangement portion 501c. That is, the closed space 50a is provided between a diaphragm 341 and a joined portion 501a of a holder member 501. However, the closed space 50a is not provided so as to extend up to the flow channel arrangement portion 501c, and the flow channel arrangement portion 501c has a solid structure.

According to this embodiment, the closed space 50a is not provided in the flow channel arrangement portion 501c of the holder member 501. However, the flow channel arrangement portion 501c is located inside the second refrigerant passage 38 so as to cross the refrigerant flow in the second refrigerant passage 38. Accordingly, the refrigerant temperature in the second refrigerant passage 38 is transferred to the fluid mixture inside the closed space 50a from the flow channel arrangement portion 501c through the joined portion 501a. Therefore, compared to the second embodiment, a response is slowed down. Compared to the first embodiment, the power element 50 can be more accurately operated in accordance with the refrigerant temperature in the second refrigerant passage 38.

This embodiment can be combined with the above-described fifth embodiment. Similarly to the fifth embodiment, the collar 344 according to this embodiment can include the extension portion 344*d* (refer to FIG. 15).

Other Embodiments (1) In FIG. 12 according to the above-described fourth embodiment, a wall member 504 covers an inner peripheral surface 501*d* of a flow channel arrangement portion 501*c*. However, in addition to the inner peripheral surface 501*d* or instead of the inner peripheral surface 501*d*, the wall member 504 may cover an outer peripheral surface 501*e* of the flow channel arrangement portion 501*c*.

(2) In the above-described respective embodiments, a fluid introduction path 343*c* is provided in holder members 343 and 501, but may be provided in a diaphragm 341.

(3) In the above-described respective embodiments, an entire circumference of a diaphragm 341 is welded to holder members 343 and 501 so as to ensure air-tightness of power elements 34 and 50. However, if the air-tightness of the power elements 34 and 50 is ensured, the diaphragm 341 may be joined to the holder members 343 and 501 by using a method other than the welding.

(4) In the above-described respective embodiments, an expansion valve 12 configures a part of a vapor compression type refrigeration cycle 10, but may be used for another application.

(5) In the above-described respective embodiments, an expansion valve 12 has a configuration in which power elements 34 and 50 expand in accordance with a refrigerant temperature in a second refrigerant passage 38. However, the expansion valve 12 may have a configuration in which the power elements 34 and 50 expand in accordance with temperatures other than the refrigerant temperature in the second refrigerant passage 38.

(6) In the above-described respective embodiments, a refrigerant which is a fluid the same as that in a first refrigerant passage 36 flows in a second refrigerant passage 38. However, a fluid which is different from that in the first refrigerant passage 36 may flow in the second refrigerant passage 38.

(7) In the above-described respective embodiments, closed spaces 34*a* and 50*a* provided in power elements 34 and 50 function as a single space, but may be divided into multiple spaces which are independent from each other.

(8) In the above-described respective embodiments, an enclosed fluid which is enclosed in closed spaces 34*a* and 50*a* of power elements 34 and 50 is a fluid mixture in which a refrigerant and inert gas are mixed with each other, but may be only the refrigerant. Furthermore, the enclosed fluid is not particularly limited as long as the enclosed fluid is a fluid whose volume expands in accordance with temperature rising.

(9) In the above-described respective embodiments, a diaphragm 341 is joined to a holder member 343 and a collar 344 in a state where the diaphragm 341 is pinched by the holder member 343 and the collar 344. However, without disposing the collar 344, the diaphragm 341 may be joined to the holder member 343.

(10) In the above-described respective embodiments, displacement in a direction of a uniaxial center CL1 of holder members 343 and 501 is transmitted to a spherical valve 321 or a valve body 328 via an actuating bar 323. However, without being limited to the actuating bar 323, the displacement may be transmitted to the spherical valve 321 or the valve body 328 via a member which has no bar shape, for example.

This disclosure is not limited to the above-described embodiments, and can be appropriately modified within the scope described in Claims. The above-described embodiments are not irrelevant with each other, and can be appropriately combined with each other except when the combination is obviously unavailable. In the above-described respective embodiments, elements configuring the embodiments are not necessarily indispensable as a matter of course, except when the elements are particularly specified as indispensable and the elements are considered as obviously indispensable in principle. In the above-described respective embodiments, when numerical values such as the number, figures, quantity, a range of configuration elements in the embodiments are described, the numerical values are not limited to a specific number, except when the elements are particularly specified as indispensable and the numerical values are obviously limited to the specific number in principle. In the above-described respective embodiments, when a material, a shape, and a positional relationship of the configuration elements are described, the configuration elements are not limited to the material, the shape, and the positional relationship, except when the configuration elements are particularly specified and are limited to a specific material, shape, and positional relationship in principle.

What is claimed is:

1. An expansion valve comprising:
    an expansion unit that has a diaphragm expanding in an axial direction of a uniaxial center, and an enclosing space forming member stacked with the diaphragm in the axial direction, the enclosing space forming member defining a fluid enclosing space, in which an enclosed fluid is sealed, between the diaphragm and the enclosing space forming member in the axial direction;
    a flow channel forming portion that defines a first flow channel through which a flowing fluid flows, the first flow channel having a decompressing flow channel to decompress the flowing fluid;
    a valve body that selectively opens and closes the decompressing flow channel;
    a pressing portion that is fixed to the flow channel forming portion, the diaphragm being pressed against the pressing portion in the axial direction when the diaphragm expands in the axial direction; and
    a displacement transmitting portion that transmits displacement of the enclosing space forming member along the axial direction to the valve body, the displacement transmitting portion selectively increasing and decreasing an opening degree of the valve body, wherein
    the enclosing space forming member is displaced away from the pressing portion as the diaphragm outwardly expands in the axial direction.

2. The expansion valve according to claim 1, wherein
    the diaphragm has a peripheral edge portion at a peripheral edge of the diaphragm,
    the enclosing space forming member has an annular contact surface in contact with the peripheral edge portion of the diaphragm, and
    the enclosing space forming member is joined to an outer side of the diaphragm, the outer side of the diaphragm being outward of an inner peripheral end of the contact surface in a radial direction of the uniaxial center.

3. The expansion valve according to claim 2, wherein
    the expansion unit has an annular collar that is disposed on a side of the diaphragm opposite to the contact surface of the enclosing space forming member in the axial direction of the uniaxial center, the collar has a collar contact surface in contact with the diaphragm, and the collar contact surface is joined to an outer side of the diaphragm, the outer side of the diaphragm being outward of an inner peripheral end of the collar contact surface in the radial direction of the uniaxial center.

4. The expansion valve according to claim 3, wherein the collar includes a prohibiting portion that prohibits the diaphragm from expanding to be deformed.

5. The expansion valve according to claim 4, wherein the prohibiting portion extends radially inward from the collar and prohibits deformation of the diaphragm by coming into contact with the diaphragm when the diaphragm expands to be deformed.

6. The expansion valve according to claim 1, wherein a second flow channel, through which the flowing fluid flows, is formed in the flow channel forming portion, the second flow channel being separately from the first flow channel, and the enclosing space forming member includes a flow channel arrangement portion arranged inside the second flow channel.

7. The expansion valve according to claim 6, wherein an accommodating space in communication with the second flow channel is formed in the flow channel forming portion, and the diaphragm of the expansion unit is accommodated inside the accommodating space.

8. The expansion valve according to claim 6, wherein the fluid enclosing space is formed to extend to the flow channel arrangement portion.

9. The expansion valve according to claim 8, wherein the expansion unit has an adsorbent to adsorb the enclosed fluid, the adsorbent being disposed inside a portion of the fluid enclosing space included in the flow channel arrangement portion.

10. The expansion valve according to claim 8, wherein at least one of an inner peripheral surface and an outer peripheral surface of the flow channel arrangement portion is covered with a member that has thermal conductivity lower than that of the enclosing space forming member.

11. The expansion valve according to claim 6, wherein the enclosing space forming member includes a plurality of the flow channel arrangement portions.

12. The expansion valve according to claim 1, wherein a second flow channel, through which the flowing fluid flows, is formed in the flow channel forming portion, the second flow channel being separately from the first flow channel, an accommodating space in communication with the second flow channel is formed in the flow channel forming portion, and the diaphragm of the expansion unit is accommodated inside the accommodating space.

13. The expansion valve according to claim 1, wherein the displacement transmitting portion includes an actuating bar that is restrained in the radial direction of the uniaxial center with respect to the flow channel forming portion, the actuating bar extending in the axial direction of the uniaxial center, a fitting hole is formed on one side of the enclosing space forming member opposite to the diaphragm in the axial direction of the uniaxial center, and the actuating bar is fitted into the fitting hole.

14. The expansion valve according to claim 1, wherein the displacement transmitting portion includes a plurality of the actuating bars that extend in the axial direction of the uniaxial center, the plurality of actuating bars are interposed between the enclosing space forming member and the valve body in the axial direction of the uniaxial center, and the plurality of actuating bars are arranged in parallel with each other.

15. The expansion valve according to claim 1, wherein the expansion unit is accommodated inside the flow channel forming portion.

16. The expansion valve according to claim 1, wherein the pressing portion is formed of a resin.

17. The expansion valve according to claim 1, wherein the diaphragm is directly, without interruption, pressed against the pressing portion in the axial direction when the diaphragm expands in the axial direction.

18. The expansion valve according to claim 1, wherein the enclosed fluid is fluid tightly sealed in the fluid enclosing space between the diaphragm and the enclosing space forming member in the axial direction.

19. The expansion valve according to claim 1, wherein the fluid is a refrigerant.

20. The expansion valve according to claim 19, wherein the refrigerant is a gas-liquid two-phase refrigerant.

* * * * *